US011809490B2

(12) United States Patent
Rackley, III et al.

(10) Patent No.: US 11,809,490 B2
(45) Date of Patent: *Nov. 7, 2023

(54) SYSTEM AND METHOD FOR IDENTIFYING CONTENT RELEVANT TO A USER BASED ON LYRICS FROM MUSIC

(71) Applicant: KENZIE LANE MOSAIC, LLC, Atlanta, GA (US)

(72) Inventors: Brady L. Rackley, III, Atlanta, GA (US); Sangameswar Venkatraman, Atlanta, GA (US); Michelle Levy Russell, Atlanta, GA (US); Gregory Michael Rickman, Atlanta, GA (US)

(73) Assignee: KENZIE LANE MOSAIC, LLC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,165

(22) Filed: Apr. 3, 2022

(65) Prior Publication Data
US 2022/0229866 A1    Jul. 21, 2022

Related U.S. Application Data

(63) Continuation of application No. 16/027,495, filed on Jul. 5, 2018, now Pat. No. 11,308,157, which is a
(Continued)

(51) Int. Cl.
*G06Q 30/00* (2023.01)
*G06F 16/683* (2019.01)
*G06F 16/638* (2019.01)

(52) U.S. Cl.
CPC .......... *G06F 16/685* (2019.01); *G06F 16/639* (2019.01)

(58) Field of Classification Search
None
See application file for complete search history.

(56) References Cited

U.S. PATENT DOCUMENTS 6,816,857 B1 * 11/2004 Weissman ............... G06F 40/30
707/999.005
7,243,104 B2   7/2007 Bill
(Continued)

OTHER PUBLICATIONS

Casey; Content-Based_Music_Information_Retrieval_Current_Directions_and_Future_Challenges; IEEE; pp. 668-696; 2008.*
(Continued)

*Primary Examiner* — Radu Andrei
(74) *Attorney, Agent, or Firm* — SMITH TEMPEL; Steven P. Wigmore

(57) ABSTRACT

A song may be matched with information in a song categorization database so that one or more categories associated with the song are identified. Specifically, a method and system for associating one or more advertising categories with a song includes receiving a set of child categories and receiving a wordnet graph. Synsets from the wordnet graph are assigned to function as activators for one or more categories. Next, a set of parent categories relative to the child categories are received. One or more scores are assigned to the parent categories based on their relationships to the child categories. Synsets from a work, such as a song lyric, are compared to the wordnet graph. Relevant child categories are identified based on synsets which match one or more activators. Matching activators are found by using only hypernym relationships between a synset from a work and an activator.

20 Claims, 18 Drawing Sheets

Related U.S. Application Data continuation of application No. 14/447,401, filed on Jul. 30, 2014, now abandoned, which is a continuation-in-part of application No. 13/798,338, filed on Mar. 13, 2013, now abandoned.

(60) Provisional application No. 61/994,954, filed on May 18, 2014.

(56) References Cited

U.S. PATENT DOCUMENTS

| | | | |
|---|---|---|---|
| 7,921,369 | B2 | 4/2011 | Bill |
| 9,858,292 | B1* | 1/2018 | Setlur ............... G06F 16/50 |
| 2003/0226012 | A1* | 12/2003 | Asokan ............ H04L 63/08 380/277 |
| 2004/0060070 | A1* | 3/2004 | Mizushima ........ H04N 21/4622 348/E7.071 |
| 2006/0136292 | A1* | 6/2006 | Bhati ............... G06Q 30/0267 705/14.66 |
| 2007/0233816 | A1* | 10/2007 | Odenwald ......... G06F 16/634 709/219 |
| 2008/0288574 | A1* | 11/2008 | Sammarco ........ H04L 67/303 709/201 |
| 2009/0204640 | A1* | 8/2009 | Christensen ........ H04L 67/00 |
| 2009/0216622 | A1 | 8/2009 | Hoashi et al. |
| 2010/0332329 | A1 | 12/2010 | Roberts et al. |
| 2011/0239137 | A1 | 9/2011 | Bill |
| 2012/0226706 | A1 | 9/2012 | Choi et al. |
| 2012/0304206 | A1 | 11/2012 | Roberts et al. |
| 2014/0157325 | A1* | 6/2014 | Jabara .............. H04N 21/64707 725/59 |
| 2016/0307239 | A1* | 10/2016 | Nakanishi ......... G06Q 30/0276 |
| 2020/0104879 | A1* | 4/2020 | Christensen ......... G06Q 30/02 |

OTHER PUBLICATIONS

Casey; Content-Based_Music_Information_Retrieval_Current_Directions_and_Future_Challenges; IEEE; 7 pages; 2005.*
Casey; Content-Based_Music_Information_Retrieval_Current_Directions_and_Future_Challenges; IEEE; pp. 95-102; 2009.*
Casey; Content-Based_Music_Information_Retrieval_Current_Directions_and_Future_Challenges; IEEE 2008; pp. 668-696; 2008.
Lampropoulos; A_middleware_system_for_Web-based_digital_music_libraries; IEEE 2005; 7 pages; 2005.
Wood; Matching_Songs_to_Events_in_Image_Collections; IEEE 2009; pp. 95-102; 2009.

* cited by examiner

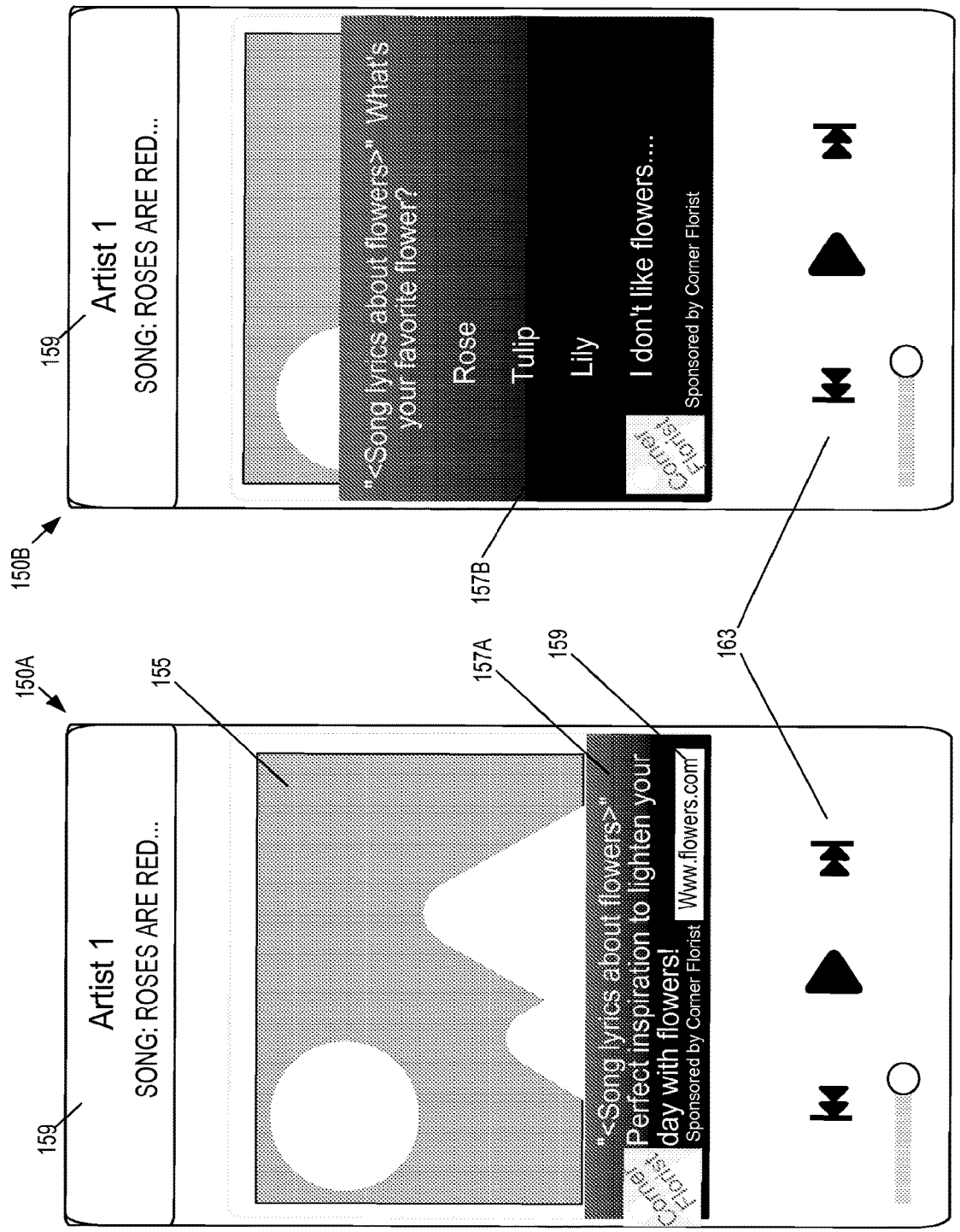

SONG TABLE

| 204 | 206 | 208 | 210 | 212 |
|---|---|---|---|---|
| 1 | Roses are Red | 9-Oct-2000 | Flowers and more Flowers | Artist 1 |
| 2 | Song 2 | 26-Mar-1973 | Album Title 2 | Artist 2 |
| 3 | Song 3 | 4-Jun-2012 | Album Title 3 | Artist 3 |

FIG. 2A

SONG CATEGORIES TABLE 214

| 204 | 216 | 218 | 220 |
|---|---|---|---|
| 1 | Industry | Traffic | 0.76 |
| 1 | Industry | Flowers | 0.56 |
| 1 | Industry | Friendship | 0.13 |
| 1 | Industry | Apartments / Rentals | 0.48 |
| 1 | Genre | Rock | 1 |
| 1 | Mood | Happy | 0.96 |
| 1 | Popularity | Song Popularity | 0.76 |
| 1 | Popularity | Artist Popularity | 0.52 |
| 1 | Popularity | Artist Familiarity | 0.89 |
| 2 | Industry | Air Travel | 0.79 |
| 2 | Industry | Astrology | 0.86 |
| 2 | Place | Spain | 0.88 |
| 2 | Genre | Pop | 1 |
| 2 | Genre | Rock | 0.95 |
| 2 | Mood | Peaceful | 0.76 |
| 2 | Popularity | Song Popularity | 0.59 |
| 2 | Popularity | Artist Popularity | 0.53 |
| 2 | Popularity | Artist Familiarity | 0.84 |
| 3 | Industry | Boating | 0.56 |
| 3 | Industry | Cruises & Charters | 0.34 |
| 3 | Industry | Casinos | 0.56 |
| 3 | Industry | Cats | 0.25 |
| 3 | Industry | Weather | 0.19 |
| 3 | Industry | Travel | 0.6 |
| 3 | Industry | Fast Food | 0.3 |
| 3 | Industry | Running & Walking | 0.27 |
| 3 | Brand | Blue Moon Beers | 0.87 |

FIG. 2B

SYSTEM AND METHOD FOR IDENTIFYING CONTENT RELEVANT TO A USER BASED ON LYRICS FROM MUSIC

CROSS REFERENCE TO RELATED APPLICATION

This patent application also claims priority under 35 U.S.C. § 119(e) to U.S. Provisional Patent Application Ser. No. 61/994,954, filed on May 27, 2014, entitled, "SYSTEM AND METHOD FOR IDENTIFYING CONTENT RELEVANT TO A USER BASED ON LYRICS FROM MUSIC." This patent application also claims priority under 35 U.S.C. § 120 and is a continuation-in-part of U.S. patent application Ser. No. 13/798,338, filed on Mar. 13, 2013, entitled, "SYSTEM AND METHOD FOR IDENTIFYING CONTENT RELEVANT TO A USER BASED ON GATHERING CONTEXTUAL INFORMATION FROM MUSIC AND MUSIC PLAYER ENVIRONMENTAL FACTORS." The contents of these two applications are hereby incorporated by reference.

BACKGROUND

The music ecosystem is constantly changing. In the past, consumers purchased records bearing machine-readable music such as records, eight track, cassettes, compact discs, and more recently, downloadable computer files such as MP3 files, ITUNES™ brand files, and the like.

Now consumers are subscribing to music streaming services where music is relayed from a computer server down to a portable computing device in near real time. The music is typically stored in a temporary file which is played almost immediately for the music consumer. The music consumer may not be required to pay for the music streaming service if the service is subsidized with advertising. In some situations, the music consumer may pay a subscription fee usually on a monthly basis such that advertising is reduced and/or eliminated from the music streaming service.

One problem that exists is that the advertising associated with music streaming services is not customized for the music consumer. If advertising is not customized for the music consumer, then advertisements may be conveyed to the music consumer which are not relevant. When advertisements are not relevant, then it is unlikely that the music consumer will purchase any services and/or goods which are associated with the advertisements.

Conventional approaches to identify advertising which is relevant to text (such as lyrics of a song as a specific example of text described herein) is to analyze the words of the text. A keyword based approach is one where keywords are defined for advertising categories and the song gets tagged with different advertising categories based on the keywords it contains.

A more refined approach is to use semantic relatedness measures to check if there are words in the song that are related to the mapped keywords. Conventional approaches do not account for the directionality of the relationship between a word in the song and a keyword.

For example, conventional semantic relatedness assumes that the relationship from bed (word in lyrics) to furniture (keyword) is the same as the relationship from furniture (word in lyrics) to bed (keyword). This may be characterized as a "symmetrical relationship" assumption.

Conventional approaches use both hypernyms and hyponyms in calculating semantic relatedness. Using both relationships often leads to unrelated advertising being presented to the music user.

Accordingly, there is need in the art for a system and method which more accurately identifies advertising that is relevant to music by analyzing lyrics of a the music.

SUMMARY OF THE DISCLOSURE

A method and system for identifying content relevant to a song is described below which does not use an "symmetrical relationship" assumption mentioned above. A song may be matched with information in a song categorization database so that one or more advertising categories associated with the song are identified. As part of the setup, the wordnet graph is deployed onto a database server within a system. Synsets from the wordnet graph are assigned to function as activators for one or more advertising categories. Synsets from a work, such as a song lyric, are compared to the wordnet graph. Relevant advertising categories are identified based on synsets which can be traversed to/matched with one or more activators.

Also, as part of the setup, hierarchical (parent-child) relationships between advertising categories are established. Once the initial advertising categories are identified based on a traversal from the song lyrics to the activators, a check may be made to determine if any parent advertising categories should be triggered.

Content relevant to an advertising category may be selected by matching the one or more song categories found above with categories in a campaign database and by matching the one or more listener categories with categories in the campaign database. Content includes, but is not limited to, advertising, trivia, referential information, weather, stock market prices, traffic information, news information, social media information, etc. The selected content may be sent to a music player.

With respect to parent-child advertising categories, the method and system manages hierarchical advertising categories by storing them in a graph format which delineates the hierarchy/relationships. Parent advertising categories are triggered based on the child advertising categories which are identified.

With this system and method, the lyrics of the song are treated as a document and Natural Language Processing (NLP) is used to render appropriate advertising content.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 1C is an exemplary screen display illustrating exemplary content identified as relevant to a user based on contextual information from music and music player environmental factors;

FIG. 1D is an exemplary screen display illustrating further exemplary content identified as relevant to a user based on contextual information from music and music player environmental factors;

FIG. 2A illustrates an exemplary song table that is stored in the song categorization database illustrated in FIG. 1B;

FIG. 2B illustrates an exemplary song categories table which is generated by the song categorization module of FIG. 1B;

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer.

By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the term "portable computing device" ("PCD") is used to describe any device operating on a limited capacity power supply, such as a battery and/or capacitor. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Figure 1A:
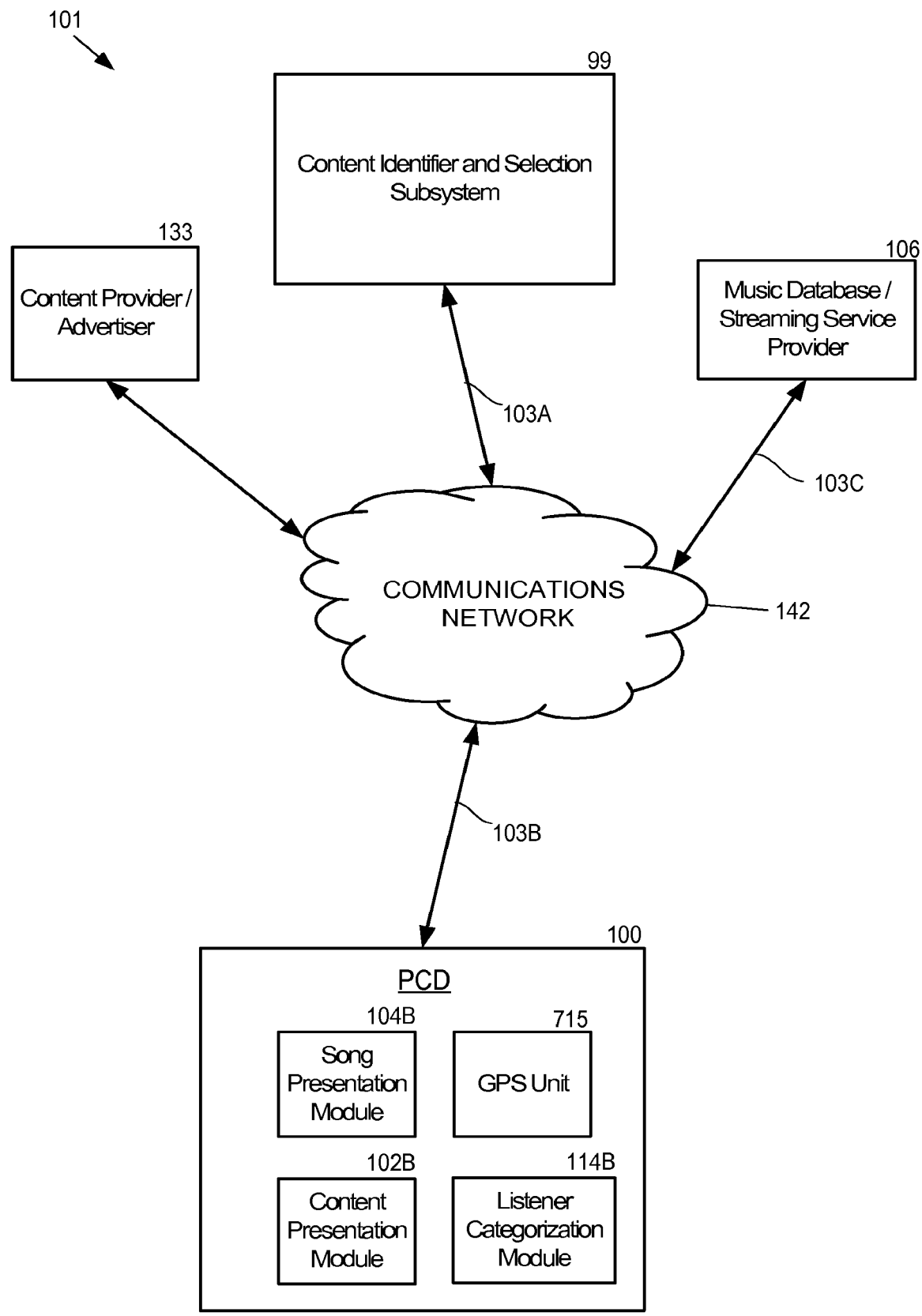
FIG. 1A is a functional block diagram illustrating an exemplary system for identifying content relevant to a user based on contextual information from music and music player environmental factors.

FIG. 1A is a functional block diagram illustrating an exemplary system 101 that includes a subsystem 99 for identifying content relevant to a user based on contextual information from music and music player environmental factors. The content may include, but is not limited to, advertising. Other content could include information like trivia, referential information, weather, stock market prices, news information, traffic information, hypertext links, social media information, etc. The system 101 further includes a content producer/advertiser 133, a music database/streaming service provider 106, and a portable computing device 100.

Each of these elements of system 101 are coupled to the computer communications network 142 via communication links 103. The communication links 103 illustrated in FIG. 1A may comprise wired or wireless communication links. Wireless communication links include, but are not limited to, radio-frequency ("RF") links, such as BLUETOOTH™ RF links as well as infrared links, acoustic links, and other wireless mediums. The communications networks 142 may comprise a wide area network ("WAN"), a local area network ("LAN"), the Internet, a Public Switched Telephony Network ("PSTN"), or any combination thereof.

The communications network 142 may be established by broadcast RF transceiver towers (not illustrated). However, one of ordinary skill in the art recognizes that other types of communication devices besides broadcast RF transceiver towers are included within the scope of the system 100 for establishing the communications network 142. The exemplary communication network 142 of FIG. 1A may employ wireless communications towers (not shown) which couple to the antennas of the portable computing device (PCD) 100.

The PCD 100 may be running or executing a client side applications such as, but not limited to, a song presentation module 104B, a content presentation module 102B, and a listener categorization module 114B. The PCD 100 may also have a global positioning system (GPS) unit 715 for ascertaining geographical coordinates of the PCD 100 as understood by one of ordinary skill in the art. The PCD 100 with its GPS unit 715 may receive and transmit signals including, location parameters, from satellites, including satellites that are part of the Global Positioning System (GPS), Galileo, GLONASS, NAVSTAR, GNSS, any system that uses satellites from a combination of these systems, or any satellite positioning system subsequently developed (collectively referred to as a Satellite Positioning System ("SPS") in this disclosure.

As understood by one of ordinary skill in the art, however, the technology of all SPS systems is constantly being improved. New as yet unknown technologies for location determination and for determining location parameters of use may be used in connection with the content identifier and selection subsystem 99, and are included in the meaning of "SPS" as described above.

The music database/streaming service 106 may comprise any one of third party music streaming services known as of this writing. For example, exemplary music databases/streaming services 106 may comprise SPOTIFY™, YOUTUBE™, PANDORA™, SLACKER RADIO™, just to name a few. In other exemplary embodiments, the music database/streaming service 106 could comprise work with files existing within the portable computing device 100 such as MP3 files and/or iTunes type files.

Figure 1B:
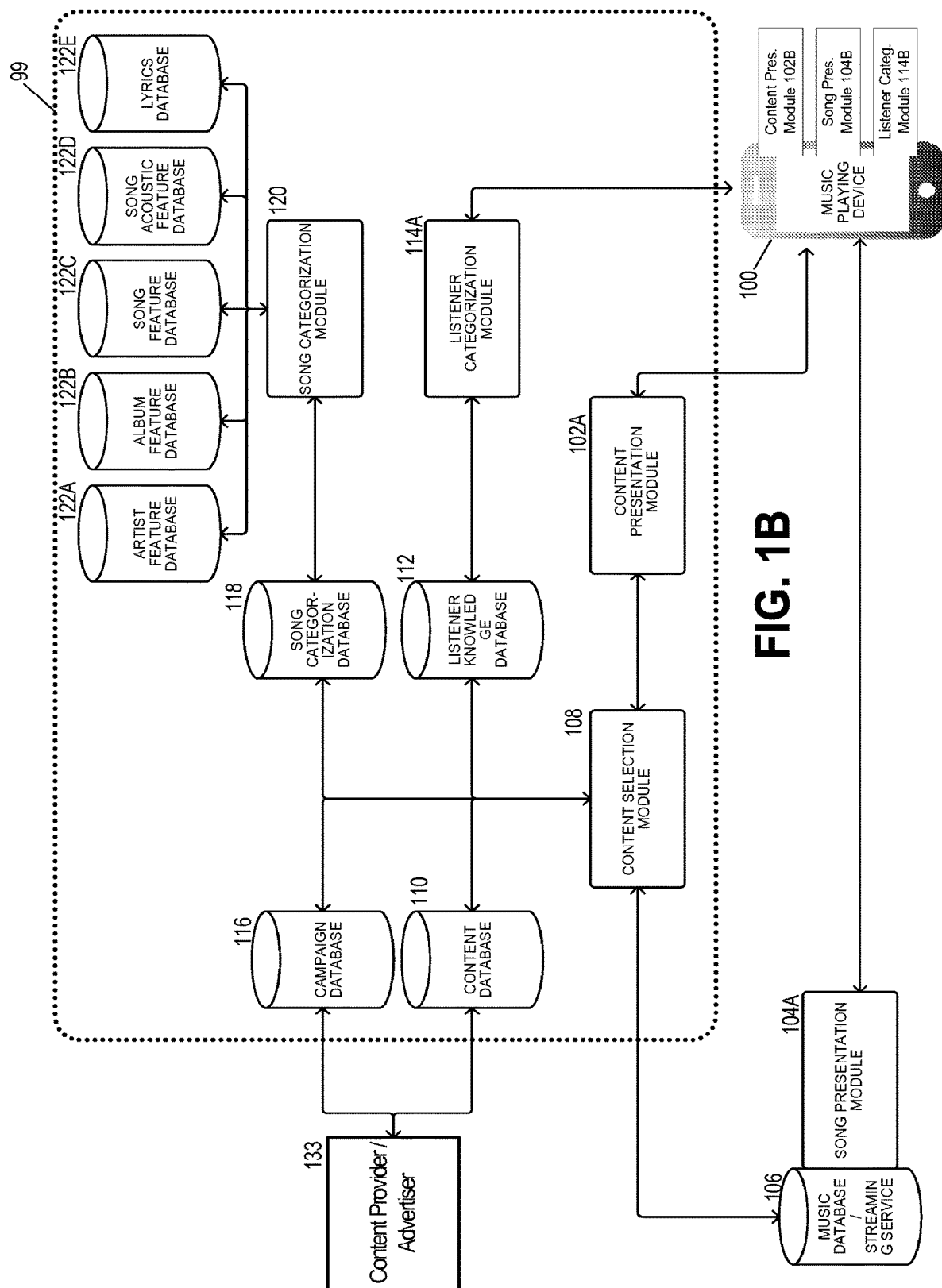
FIG. 1B is a function of block diagram illustrating further details of the system illustrated in FIG. 1A.

Referring now to FIG. 1B, this figure illustrates further details of the subsystem 99 without the communications network 142, however, the connections of the communications network between the subsystem and the other elements like the content provider 133, music database/streaming service provider 106, and PCD 100 are implied. The subsystem 99 may comprise several different music based databases 122 which feed into a song categorization module 120. The song categorization module 120 may be coupled to a song categorization database 118. The song categorization database 118 may be coupled to a campaign database 116, a content database 110, and a listener knowledge database 112.

The campaign database 116, the song categorization database 118, the content database 110, and listener knowledge database 112 may work together and feed information into the content selection module 108. The content selection module 108 may be coupled to a content presentation module 102

The listener knowledge database 112 may be coupled to a listener categorization module 114. The listener categorization module 114 may be coupled to the portable computing device 100 Similarly, a content presentation module 102 may be coupled to the portable computing device 100. Both the listener categorization module 114 and the content presentation module 102 may communicate with the portable computing device 100 over the same or different channels as understood by one of ordinary skill the art.

Further, portions of the listener categorization module 114 as well as portions of the content presentation module 102 may reside within the portal computing device 100. In other exemplary embodiments, the listener categorization module 114 and the content presentation module 102 may entirely reside within the portable computing device 100

A content producer/advertiser 133 may supply the data for and may manage the campaign database 116 and the content database 110. Meanwhile, a music database/streaming service 106 may be coupled to the content selection module 108. The music database/streaming service 106 may be coupled to a song presentation module 104 which resides on the portable computing device 100.

The artist feature database 122A, the album feature database 122B, and the song feature database 122C may be generated by software/hardware engines which crawl large databases such as those found on the Internet as understood by one of ordinary skill the art. The software/hardware engines may comb the Internet for third-party content that addresses artists, albums, and songs. This third-party content may comprise information from sources like social media (i.e. TWITTER™ accounts, FACEBOOK™ accounts, MYSPACE™ accounts, LINKED-IN™ accounts etc.) as well as from traditional information sources such as news articles from newspapers, magazines, and news information websites (Wikipedia, etc.).

The artist feature database 122A, the album feature database 122B, and song feature database 122C, may also comprise data which is generated by musical analysts. Such musical analysts may be aware of products and/or services which are associated and/or affiliated with particular artists, albums, and/or songs. For example, a musical analysts may have conducted or was aware that an interview with conducted with a particular artist who had received recent endorsements from particular products, such as a particular brand of an automobile.

These three databases 122A, 122B, and 122C may also be populated with data from third-party databases which relate or track popularity of songs, such as, but not limited to Billboard magazine's top 40 songs in the United States and in other countries.

The song acoustic feature database 122D may comprise information such as, but not limited to, frequency, tempo, sound pressure, loudness, beat, energy, and other similar acoustic features. Much of the content of the song acoustic feature database 122D may also be supplied by third-party vendors available as of this writing. The song acoustic feature database 122D may sort or categorize songs based on elements such as, but not limited to, mood. The song acoustic database 122D may also store information about each song such as, but not limited to, genre of music (i.e. classical, rock, rap, etc.), type of instruments present within a song (i.e. symphony, electric guitar, piano, etc.), the type of vocals present within the song (i.e., choir, solo vocals, etc.). The song acoustic feature database 122D may be a result of a combination of two or more third-party databases that address acoustic features of songs.

The lyrics database 122E may comprise lyrics to songs which are the words of songs as understood by one of ordinary skill the art. This database 122E may also comprise names and addresses of the holders of the copyrights for the lyrics. The content of the lyrics database 122E may be supplied by third-party vendors available as of this writing. The lyrics database 122E may also comprise keywords which are extracted with machine learning algorithms and natural language processing as understood by one of ordinary skill the art. The machine learning algorithms and natural language processing algorithms may reside within the song categorization module 120 which performs this analysis but then stores the results of the analysis in the lyrics database 122E.

These five databases 122A-122E are accessible by the song categorization module 120. The song categorization module 120 performs text mining, natural language processing, and other analysis with respect to the data which is available from these five databases. After this analysis is performed, the song categorization module 120 populates the song categorization database 118.

The song categorization database 118 may comprise a plurality of different tables. One exemplary table may include a song table 202. Another exemplary table may comprise a song categories table 214. These two tables 202, 214 are illustrated in FIGS. 2A-2B.

Referring now to FIG. 1C, this figure illustrates an exemplary screen display 150A for a portable computing device 100, such as a mobile phone. The screen display 150A may include a song identifier 159 that comprises a title of the song and the name of the Musical artist. The screen display 150A may further comprise album art 155. Album art 155 is usually the cover of packaging for phonorecords that may bear the machine-readable music, such as compact disc and/or records, etc.

The screen display 150A may further include customized content 157A and music player controls 163. The customized content 157A is generated as the output from subsystem 99 described and illustrated in FIG. 1B. According to one exemplary embodiment, the customized content 157A may comprise advertising which was determined as relevant to the music consumer based on the processes performed by the subsystem 99 described above in connection with FIG. 1B and which will be described in further detail below in connection with FIGS. 3-6.

In the exemplary embodiment illustrated in FIG. 1C, the customized content 157A comprises an advertisement for a product such as flowers. However, as understood by one of ordinary skill the art, any type of products and/or services may be part of the customized content 157A which is determined by the subsystem 99. As described above, the subsystem 99 is the determining what customized content 157A would be most relevant to the music consumer so that such content would encourage the music consumer to go out and purchase services and/or products forming part of the customized content 157 or so that such content would encourage the most engagement from the music consumer.

Categories of the customized content may include, but are not limited to, arts and entertainment; automotive; business; careers; education; family; parenting; health and fitness; food and drink; hobbies and interests; law, government and politics; news; arts and entertainment; Society; science; pets; sports; style and fashion; technology and computing; travel; real estate; shopping; religion and spirituality; and social media, just to name a few.

The customized content 157 may comprise plain text, or may comprise banner ads which include graphics and/or photos. However, the customized content 157 may comprise other elements such as hypertext links, playable video feeds, commands to open small downloadable applications, and other similar content, etc.

In the exemplary embodiment illustrated in FIG. 1C, the title of the song being played is "Roses are red . . . " The song may be an uplifting song and has an upbeat tempo and which has lyrics that mention flowers. The album art 155 may also depict a pleasant scene such as mountains, the sun, and even flowers. Based on this information, the subsystem 99 may determine that customized content 157 should comprise subject matter that may relate to flowers. As understood by one of ordinary skill in the art, other products and/or services and/or content may be determined by the subsystem 99 and is dependent on the music being conveyed to the operator of the PCD.

Referring now to FIG. 1D, this figure illustrates an exemplary screen display 150B for a portable computing device 100, such as a mobile phone. FIG. 1D is similar to the exemplary screen display 150A FIG. 1C, therefore, only differences between these two FIGs. will be described. The customized content 157B of this exemplary embodiment may comprise interactive features that request feedback from the operator of the PCD 100. In this particular embodiment, the customized content 157B may comprise a question with multiple choices of answers that may be selected by the operator of the PCD 100.

The information collected from the operator's interaction with the customized content 157B may be stored in a profile managed by the subsystem 99. For example, the profile may be stored and managed in the listener knowledge database 112 as described above. In the exemplary embodiment illustrated in FIG. 1D, the customized content 157B is requesting the operator of the PCD 100 to select his or her preference with respect two types of flowers. This customized content 157B directly corresponds to the customized content 157A of FIG. 1C described above.

The listener knowledge database 112 may be characterized as a learning database as it learns the preferences for each subscriber/operator of a PCD 100. The listener knowledge database 112 can assist in making recommendations for preferences in the content selection process as will be described below.

Referring now FIG. 2A, this figure illustrates an exemplary song table 202 that is stored in the song categorization database 118. The song table 202 may comprise several different columns of data relevant to tracking songs. Exemplary columns include, but are not limited to, a song ID column 204, a song title column 206, a release date column 208, an album title column 210, and an artist name column 212. The song ID column 204 may be associated with the song categories table 214 as illustrated in FIG. 2B.

Referring now to FIG. 2B, this figure illustrates an exemplary song categories table 214 which is generated by the song categorization module 120. The song categories table 214 may comprise several different columns of data relevant to categorizing songs by industry, genre, mood, popularity, geographical locations, brand, features, and other like characteristics. Specific subcategories within these broader categories, may include, but are not limited to, industries such as, automobiles; traffic; flowers; friendship; real estate; voting; cruises and charters; casinos; animals;

weather; travel; fast food; running and walking; beverages like beer; locations like New York, Puerto Rico; genres like rock; classical; popularity indexes such as song popularity; artist popularity; whether a recording is a live or a studio recording, and so on.

In the exemplary embodiment illustrated in FIG. 2B, exemplary columns of data include, but are not limited to, a song ID column 204, an item type column 216, an item column 218, and an item weighting column 220. The song ID column 204 generally corresponds to the similarly labeled column in the song table 202 of FIG. 2A.

The item type column 216 may list several different types of categories for a particular song as described above. The item column 218 list the specific category based on the item type 216 identified for a particular song. The item weighting column 220 lists a predetermined weight with respect to an item for a particular song that is determined by the song categorization module 120 and which will be described in further detail below in connection with FIG. 6.

Reviewing the first row of the table 214, it is understood that the song ID having the value of "1" has been associated by the song categorization module with a particular industry as indicated by the item type in column 216. In this particular example, that particular industry is traffic as indicated by column 218. This traffic industry has been assigned a relative weighting of 0.76 as indicated by the item weighting column 220.

One of ordinary skill the art appreciates that other item types and weightings are possible and are within the scope of this disclosure. Further, additional or fewer columns for the song table 202 and the song categories table 214 may be utilized and would be within the scope of this disclosure. The song categorization database 118 comprising these tables 202, 214 is constantly updated by the song categorization module 120 as the song categorization module 120 collects data from each of its five databases 122 described above.

The song categorization module 120 in one exemplary embodiment functions as an expert system in which rules may be generated by operators who have based knowledge with respect to how songs and related information should be categorized in order to select relative content for listeners. According to other exemplary embodiments, a song categorization module 120 may comprise machine learning algorithms which improve over time in response to the updates and changes made to the five main databases 122.

The campaign database 116 and the content database 110 may be part of subsystem 99 or they may reside outside of subsystem 99 and may be maintained by third parties relative to the subsystem 99. The campaign database 116 may comprise criteria from advertisers on the when advertisements should be displayed to a particular user or subscriber of the music database/streaming service 106.

Such criteria in the campaign database 116 may include, but is not limited to, demographic data such as male or female, ages, personal interests, geographic locations like cities, types of songs that should be associated with the particular campaign, industries that should be associated with the particular campaign, and moods of songs relevant to particular products and/or services, etc. Campaigns may be associated with products and/or services. In alternative embodiments, a campaign may not necessarily be an advertisement and it may not be associated with a product or service. It may comprise news information and/or social media information mentioned previously.

The campaign database 116 may further comprise pricing data such as, but not limited to, prices an advertiser is willing to pay for cost per impression with a particular subscriber of the music database/streaming service 106.

The campaign database 110 may comprise the actual content that will be displayed or conveyed in other ways to the listener or subscriber of the music database/streaming service 106. The campaign database 116 may reference the content stored in this campaign database 110. It is also possible that the campaign database 116 simply has a reference to a content URL (another content database not illustrated) and it may not reference the content database 116 itself in such a scenario. Rather, the content selection module 108 may determine the winning campaign, and then obtains a universal resource locater (URL) from the campaign database 116 which references another external database (not illustrated) and retrieves that content from that external database (not illustrated) via the URL. The content within the content database may comprise advertisements and/or other types of information as mentioned previously.

The listener knowledge database 112 is coupled to the listener categorization module 114 as mentioned previously. The listener knowledge database 112 may maintain a profile for each listener and such profiles may include a unique identifier associated with each particular portable computing device 100 used by a listener. The profiles may also include cookies that track Internet content being browsed by the operator of the portable computing device 100.

The profiles may also include geographical coordinates generated by the GPS unit of the portable computing device 100. The profiles may include information such as responses generated by the operator of the PCD 100 in connection with customized content that request input from the operator such as illustrated in FIG. 1D described above (i.e.—answers to questions of interest to the operator of the PCD 100).

Profiles may further include information that the listener categorization model 114 may retrieve from social media such as personal websites, like FACEBOOK™ profiles, TWITTER™ accounts, LINKED-IN™ profiles, and other social media sources etc. Profiles on listeners in the listener categorization module 114 may also track prior songs listen to by the listener in connection with the music database/streaming service 106.

The profiles contained within the listener knowledge database 112 are maintained and updated by the listener categorization module 114. The listener categorization module 114 may also retrieve other relevant data in connection with the geographical coordinates that it may receive from the portable computing device 100. For example, a listener categorization module 114 may determine that the portable computing device 100 is within an automobile and that the automobile is traveling on a particular road. The listener categorization module 114 may then retrieve data from automobile traffic databases to determine the current state of traffic relative to the location of the portable computing device. The listener categorization module may also determine the weather conditions for the location of the portable computing device 100 based on the geographical coordinates.

A listener profile stored within the listener knowledge database 112 may include the following exemplary information: user ID 1234 is a male who is 38 years old and is currently driving a car on Route 185 north of Atlanta and the current weather conditions are sunny with a temperature of 65° F. This male prefers music genres of rock 'n roll and some punk rock. The portable computing device 100 is model XYZ manufactured by ABC brand of computers.

The content selection module 108 is coupled to the content database 110, the listener knowledge database 112, the campaign database 116, and the song categorization database 118. The content selection module 108 compares each song being played with the listeners profile and with the campaigns available in the campaign database 116 to determine which content from the content database 110 is the best match for a listener. The content selection module 108 then takes the selected content and transmits it to the content presentation module 102, which may also reside on the portable computing device 100.

As described above, the content from the content database 110 may comprise advertising but is not limited to advertising. For example other content may include, but is not limited to, trivia, referential information, weather conditions such as temperature, wind speed, weather forecast, news, social media information, and other types of information which is not advertising but is relevant to a user's profile plus the music being consumed.

The content presentation module 102 may generate the visual and/or audio components relative to the content which was selected by the content selection module 108. For example, the content presentation module 102 may generate the album art associated with the current song which is being presented with the song presentation module 104 from the music database/streaming service 106. According to one exemplary embodiment, the content selection module 108 may combine selected content from the content selection module 108 with album art in order to create a single file that comprises content, such as an advertisement, combined with the album art in a single file that is transmitted to the portable computing device 100 while the current song is being played using the song presentation module 104.

The content may comprise a hypertext link which is "tappable" so that the hypertext link is activated upon tapping by the listener. For example, such as illustrated in FIG. 1C, the customized content 157 A. may comprise a hypertext link 159 which allows the listener to navigate with an Internet browser to a particular product website while he or she is listening to a current song. As another example, the content may comprise a video clip or a hypertext link which takes you to a video clip like an advertisement for a new movie being played in a movie theater. The content presentation module 102 may comprise a server-side module as well as a client-side module which resides on the portable computing device 100.

The music database/streaming service 106 may comprise any one of third party music streaming services known as of this writing. For example, exemplary music databases/streaming services 106 may comprise SPOTIFY™, YOUTUBE™, PANDORA™, SLACKER RADIO™, just to name a few. In other exemplary embodiments, the music database/streaming service 106 could comprise work with files existing within the portable computing device 100 such as MP3 files and/or iTunes type files.

The song presentation module 104 may comprise a client side application which resides on the portable computing device 100 as understood by one of ordinary skill in the art. A portion of the song presentation module 104 may also reside on the music database/streaming service 106.

Figure 3:
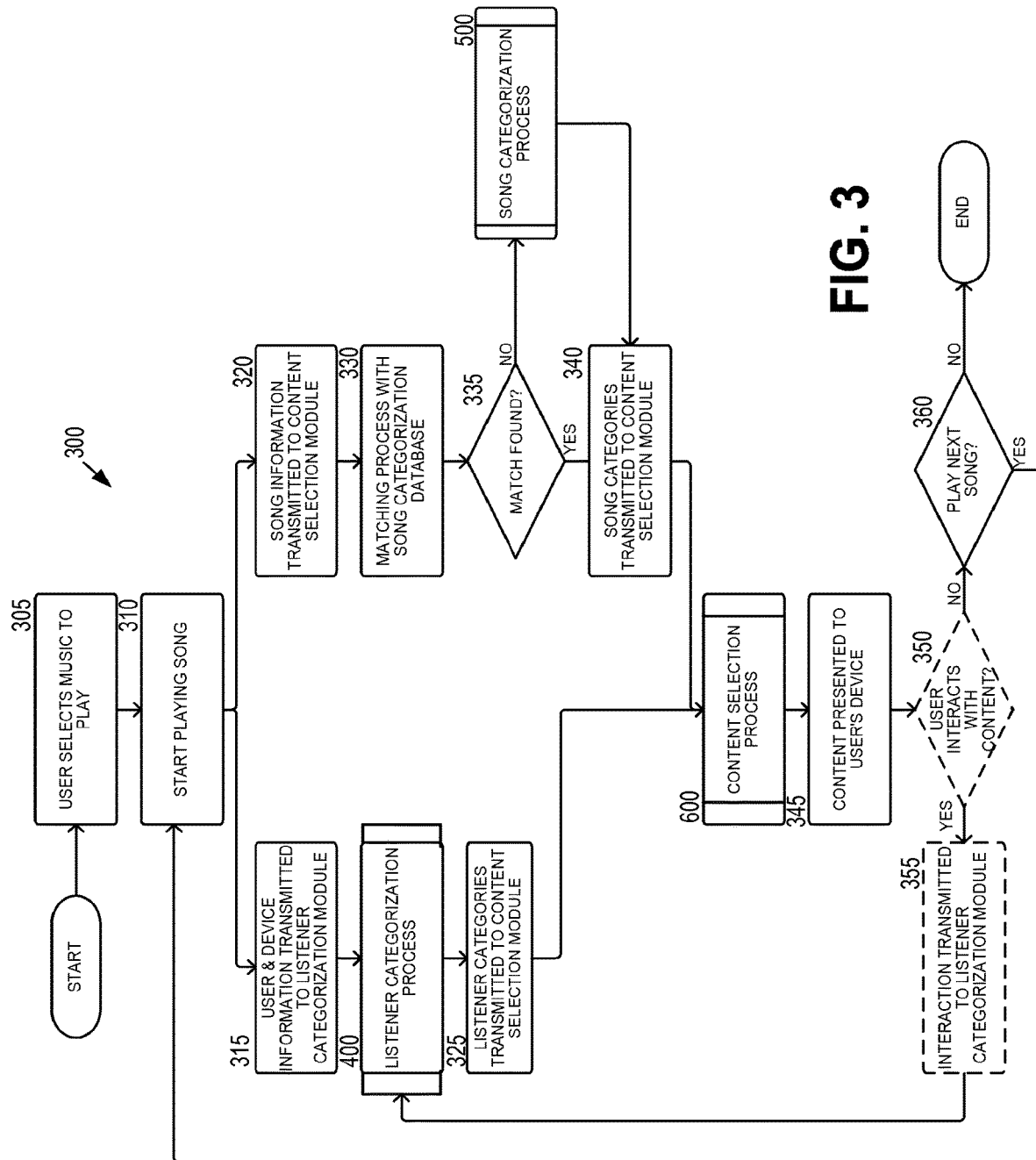
FIG. 3 is logical flowchart illustrating a method for identifying content relevant to a user based on contextual information from music and music player environmental factors.

FIG. 3 is a logical flow diagram illustrating a method 300 for selecting information content relevant to a music subscriber according to one exemplary embodiment. Block 305 is the first step of method 300. In block 305, the music subscriber selects music to play with his or her portable computing device 100. In this block, the portable computing device 100 may transmit commands over the communications network 142 to both the song presentation module 104 residing on the music database/streaming service 106 and the listener categorization module 114.

In response to these commands, the song presentation module 104 residing on the music database/streaming service 106 may transmit streaming music signals over the communications network 142 to the song presentation module 104 residing on the portable computing device 100 in block.

Next, in block 315, the profile of the basic subscriber as well as device information is transmitted from the portable computing device 100 over the communications network 142 to the listener categorization module 114. The device information may comprise geographical coordinates ascertained from a GPS unit on the portable computing device 100.

The device information may further comprise the current operating system version for the portable computing device 100, and the local date and time as tracked by the portable computing device 100 and cookies and other data residing on the portable computing device 100. In block 320, the current song being played and information related to the song may be transmitted from the music database/streaming service 106 over the communications network 142 to the content selection module 108.

Blocks 315 and 320 are illustrated as being run in parallel to one another as understood by one of ordinary skill in the art. This means that the steps in the blocks may be performed simultaneously or in parallel with one another.

After block 315, then in routine block 400 the categorization module 114 may perform its subroutine or sub process which will be described in further detail below in connection with FIG. 4. In this routine block 400, the listener categorization module 114 is refining the preferences and information with respect to the profile maintained on the music subscriber in the listener knowledge database 112. At the end of this routine block 400, any real-time context information that is available, such as time of day, geographical location, weather, etc. has been merged with the profiles and preferences stored for the music subscriber and the listener knowledge database 112. The profiles and preferences of the music subscriber may comprise demographic information such as, but not limited to, age, religious affiliation, political orientation, sex, name, home address, and other similar information.

Subsequently, in block 325, the listener categories that were created as a result of the listener categorization subroutine or sub process 400 are transmitted to the content selection module 108.

Meanwhile, after block 320 in which the song information was transmitted to the content selection module 108, in block 330, the content selection module 108 performs a matching process with the song categorization database 118 or the content selection module 108 sends a query to the song categorization database. As noted previously, the song categorization database 118 is generated in advance of song being played by a music subscriber with her portable computing device 100.

In other words, the song categorization database 118 has been pre-populated with data for millions of songs with the intent that the content selection module 108 will find a match of categories associated with a particular song fairly quickly while it is currently being played by a music subscriber on the portable computing device 100.

In decision block 335, the content selection module 108 determines if categories have been found for the particular song being played by the music subscriber on the portable computing device 100. If the inquiry to decision block 335 is positive, then the "YES" branch is followed to block 340 in which the categories associated with the currently played song are transmitted to the content selection module 108.

For example, referring briefly to table 202 of FIG. 2A, if the current song being played has the song identifier of "1", then a match would be found in the song categories table 214 for all song identifiers having a value of "1" in column 204. So for the song identifier having a value of "1", the industries related to the song as listed in the first four columns of table 214, are traffic, flowers, friendship, apartments/rentals. These industries would be transmitted to the content selection module 108 in association with the song identifier having a value of "1."

If the inquiry to decision block 335 is negative, then the "NO" branch is followed to routine or sub process block 500 in which a song categorization processes initiated for the particular song being played.

Further details of routine or sub process block 500 will be described below in connection with FIG. 5. if the content selection module 108 does encounter a song which has not been matched meaning that it has not been categorized within the song categorization database 118.

Then the song categorization module 120 may run an abbreviated/truncated categorization process in block 500 in order to conserve time since the current song being played by the music subscriber on the portable computing device 100 has a finite limit probably only a few minutes. The song categorization module 120 may flag a particular unmatched song for later or subsequent processing after the abbreviated processing has occurred to yield some meaningful, yet abbreviated matching results. In other exemplary embodiments, if no match is found at the end of decision block 335, the song categorization process 500 may be skipped in order to conserve on time.

In routine block 600, the content selection module 108 executes its content selection process which will be described in further detail below in connection with FIG. 6. At the end of this routine block 600, the content selection module 108 has selected the content 157 that is deemed to be the most relevant to the song being played and most relevant to the music subscriber.

In block 345, the content presentation model 102 receives the selected content 157 from the content selection module 108 and formats this information for presentation on the portable computing device 100. In this block 345, the content presentation model 102 residing on the server side of the subsystem 99 may transmit the formatted content 157 as a message over the communications network 142 to the portable computing device 100.

In optional decision block 350, the content presentation module 102B residing on the portable computing device 100 may determine if the music subscriber has interacted with any of the selected content 157. For example, content 157B displayed on the portal computing device 100 may comprise a series of questions such as illustrated in FIG. 1D described above.

Decision block 350 is highlighted with dashed lines to indicate that this block is optional. In other words, if the content 157 does not require any interaction from the music subscriber, then this decision block 350 may be skipped and the process 300 may proceed to decision block 360.

If the inquiry to decision block 350 is positive meaning that the music subscriber has interacted with the content 157, then the "YES" branch may be followed to optional block 355. In optional block 355, the interaction or information collected from the content 157 is transmitted from the portable computing device 100 over the communications network 142 to the listener categorization module 114. Optional block 355 is also highlighted with dashed lines to indicate that this step may be skipped if the content 157 does not require any interaction from the music subscriber.

If the inquiry to optional decision block 350 is negative, then the "NO" branch is followed to decision block 360. In decision block 360, the song presentation model 104B residing on the portable computing device 100 determines if the next song is going to be played by the portable computing device 100.

Alternatively, decision block 360 may have a threshold of time meaning that additional content may be selected and presented to the music subscriber if the music database/streaming service provider desires more than one piece of content to be presented to a music subscriber during a single song. In other words, decision block 360 may comprise a time threshold that may be arbitrarily selected by the music database/streaming service provider. Such time limits may be on the order of every ten, twenty, or thirty seconds, given that most music scores may range between two and four minutes in length.

If the inquiry to decision block 360 is positive, then the "YES" branch is followed back to block 310. If the inquiry to decision block 360 is negative, then the "NO" branch is followed in which the process or method 300 ends.

Figure 4:
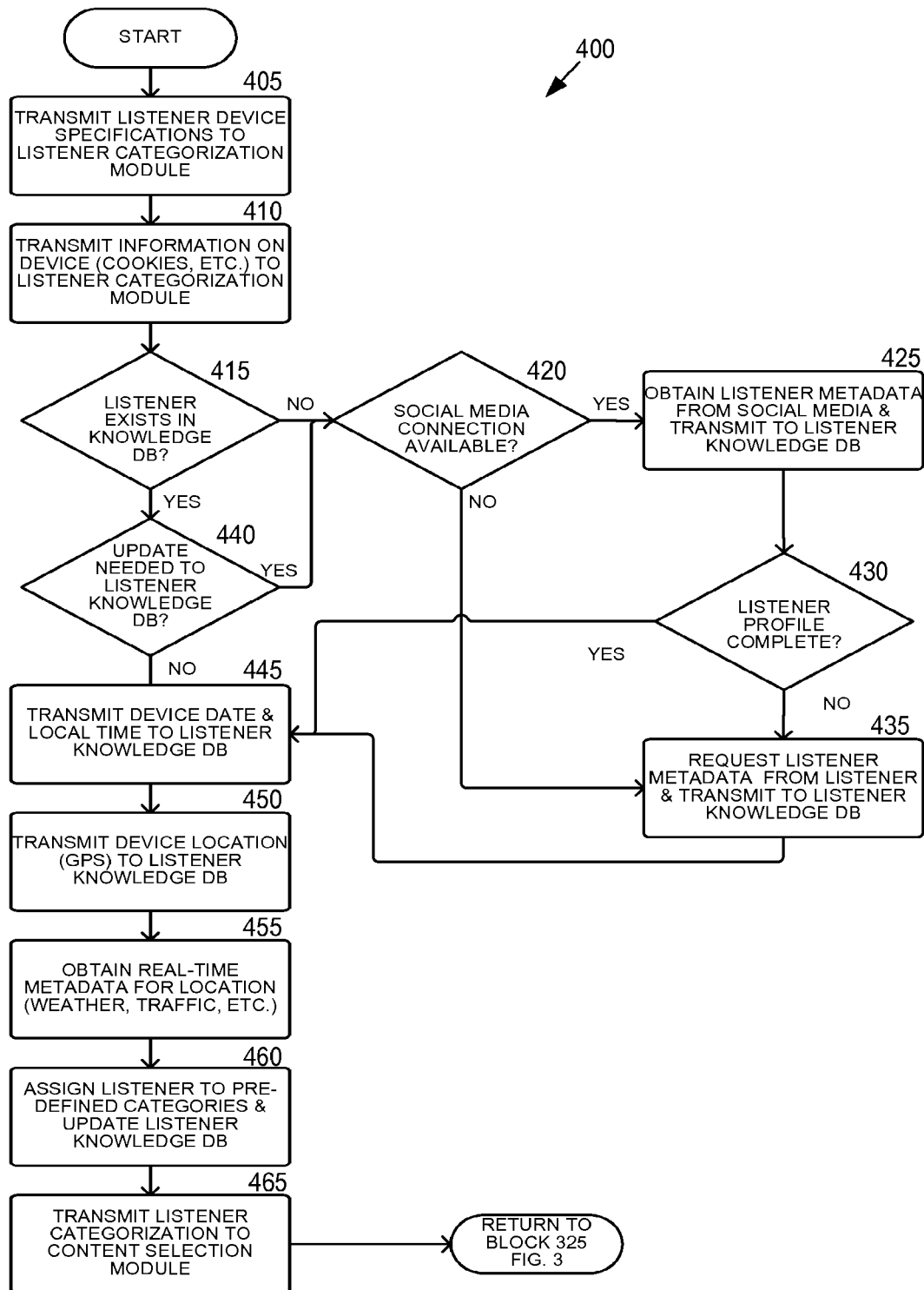
FIG. 4 is logical flowchart illustrating a submethod or routine of FIG. 3 for tracking profile data of the music subscriber as well as any relevant context information that may be ascertained from the portable computing device according to one exemplary embodiment.

FIG. 4 is a logical flow diagram illustrating a submethod or routine 400 of FIG. 3 for tracking profile data of the music subscriber as well as any relevant context information (geographical location, situational information, etc.) that may be ascertained from the portable computing device according to one exemplary embodiment. Block 405 is the first step of submethod or routine 400.

In block 405, the portable computing device 100 may transmit over the communications network 142 to the listener categorization module 114 features about the portable computing device 100 such as the type of portable computing device 100, the model of the portable computing lies 100, the current operating system of the portable computing device 100, and any related software that is loaded on the portable computing device 100 which may be relevant to the music subscription/playing service.

In block 410, the portable computing device 100 may also transmit context information as well as other information to the listener categorization module 114. Other context information may include accelerometer data to determine that the portable computing device 100 is moving within a vehicle. Other information may include software specific information such as cookies, and other types of data collected with application software running on the portable computing device 100. Other information may also include data collected by the song presentation module 104B residing on the portable computing device.

Data which is collected by the song presentation model 104B may be transmitted back to the music database/streaming service 106. This data collected by the song presentation model 104B may be shared with the listener categorization module 114B residing on the portable computing device and/or the data may be provided directly by the music database/streaming service 106 through the content selection model 108. Alternatively, the song presentation model 104A may be instructed to transmit any of its data over the communications network 142 to the listener categorization module 114A residing on the server side of the subsystem 99.

After block 410, in decision block 415, the listener categorization module 114A on the server side determines if the music subscriber/listener exists in the current iteration of the listener knowledge database 112. If the inquiry to decision block 415 is positive, then the "YES" branch is followed to decision block 440. If the inquiry to decision block 415 is negative, then the "NO" branch is followed to decision block 420.

In decision block 420, the listener categorization module 114A may determine if the music subscriber/listener has granted permission to access any social media accounts maintained by the subscriber/listener such as, but not limited to, any TWITTER™ accounts, FACEBOOK™ accounts, MYSPACE™ accounts, and/or LINKED-IN™ accounts, etc. Usually, during installation of the song presentation module 104B residing on the portable computing device 100 the listener will be prompted to grant permissions for accessing any active social media accounts by the music streaming software.

If the inquiry to decision block 420 is negative meaning that the listener did not give permission to any of his or her social media accounts, then the "NO" branch is followed to block 435. If the inquiry to decision block 420 is positive, then the "YES" branch is followed to block 425.

In block 425, the listener categorization module 114 may obtain listener metadata from social media and transmit this metadata to the listener knowledge database 112. Next, in decision block 430, the listener categorization module 114 may determine if the listener profile is complete. The listener categorization module 114 may determine completeness based on the number of fields that contain data within a particular profile.

If the listener categorization module 114 does not reach a predetermined threshold which may be adjusted on occasion, the listener categorization module 114 may ask for additional information from the music subscriber/listener him or herself. In other words, if the inquiry to decision block 430 is negative, then the "NO" branch may be followed to block 435 in which the listener categorization module 114 requests additional information or metadata from the listener directly and then transmits this information to the listener knowledge database 112.

If the inquiry to decision block 430 is positive meaning that the listener categorization module 114 has determined that the listener profile was complete or has reached a predetermined level, then the "YES" branch is followed to block 445.

In decision block 440, the listener categorization module 114 may determine if it is time to update the listener knowledge database 118 with respect to the listener/music subscriber being evaluated. This decision block 440 may comprise a timing threshold such as on the order of minutes, hours, or days. For example, the listener categorization module 114 may update profiles of music subscribers once a day so that unnecessary and/or excess processing does not occur during high-volume uses of the subsystem 99.

If the inquiry to decision block 440 is positive, then the "YES" branch is followed back to decision block 420. If the inquiry to decision block 440 is negative, then the "NO" branch is followed to block 445.

In block 445, the listener categorization module 114 transmits the local date and time being tracked by the portable computing device to the listener knowledge database 112. In block 450, the listener categorization module 114 transmits the location of the portable computing device 100, such as its geographical coordinates, to the listener knowledge database 112.

Based on this information from blocks 445 and 450, the listener categorization model 114 may obtain real-time metadata for the music subscriber/listener based on the geographical location of the portable computing device 100. This real-time metadata may comprise information such as, but not limited to, weather, traffic conditions, whether the portable computing device 100 is present within a moving vehicle or not, etc.

Next, in block 460, the listener categorization module 114 in view of all of the data retrieved in blocks 425, 435, 445, 450, and 455, it may assign the music subscriber/listener to one or more predefined categories and then transmits these categories to the listener knowledge database 112. For example, such categories include, but are not limited to, gender, age, religious affiliation, political orientation, etc.

Subsequently, in block 465 after the listener categorization module 114 has assigned the listener/subscriber to the one or more predefined categories, the categorization module 114 then transmits these categories to the content selection module 108. This submethod 400 then returns to block 325 of FIG. 3.

Figure 5:
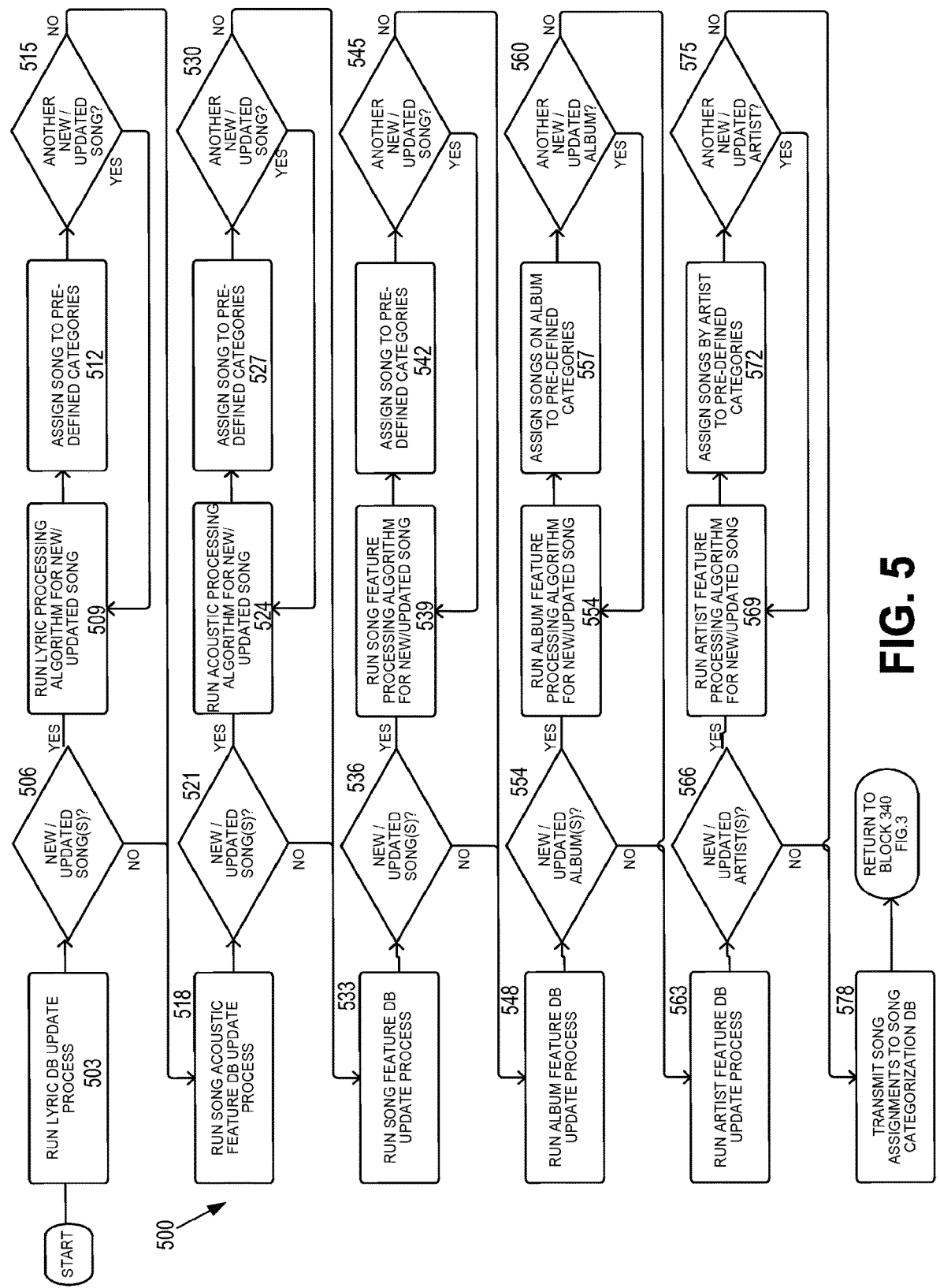
FIG. 5 is logical flowchart illustrating a submethod or routine of FIG. 3 for categorizing songs according to on exemplary embodiment.

FIG. 5 is a logical flow diagram illustrating a submethod or routine 500 of FIG. 3 for categorizing songs according to one exemplary embodiment. As noted previously, this song categorization submethod 500 is usually performed off-line or at a different time while a music subscriber/listener is listening to a song. If a song that is selected by a music subscriber is not found in the song categorization database 118, then a truncated/abbreviated version of a submethod 500 may be executed in order to conserve time.

The song categorization database 118 may follow one or more industry standards and how it categorizes songs. For example, the song categorization database 118 may follow Exhibit A on IAB contextual taxonomy, developed by IAB networks and exchanges of quality assurance guidelines version 1.5 which is available as of this writing. Exhibit A on the IAB contextual taxonomy lists several different tier 1 broad categories in several different tier 2 narrower categories which fall within the tier 1 broad categories. Some of the tier 1 broad categories include, but are not limited to, arts and entertainment; automotive; business; careers; education; family and parenting; health and fitness; food and drink; hobbies and interests; home and garden; while government and politics; news; personal finance; Society; science; that's; sports; style and fashion; technology and computing; travel; real estate; shopping; religion and spirituality; and uncategorized which currently includes just social media as its tier 2 category.

Block 503 is the first step of submethod or routine 400. In block 503, the song categorization module 120 retrieves a song and determines in block 506 if the song is new relative to the song categorization database 118. If the inquiry to decision block 506 is negative, then the "NO" branch is followed to block 518 in which the song categorization module 120 determines if the song acoustic feature database update process needs to be started/executed.

If the inquiry to decision block 506 is positive meaning that the song is new relative to the song categorization database 118, then the "YES" branch is followed to block 509. In block 509, the song categorization module 120 may work with the lyrics database 122E along with a lyric processing algorithm for analyzing a particular song.

In this block 509, natural language processing (NLP), theme extraction processing, text based extraction algorithms as understood by one of ordinary skill the art may be used in which keywords, sentiment and themes are extracted from the lyrics of a particular song. Next, in block 512, based on the keywords which were extracted, the song categorization module 120 may assign the keywords to predefined categories such as traffic, flowers, friendship as discussed above in connection with the songs categories table 214 as illustrated in FIG. 2B.

The remaining blocks 518-530, 533-545, 548-560, and 563-575 all flow similarly relative to blocks 503-515. With respect to blocks 518-530 which address acoustic processing of a song, in block 524 in which acoustic processing algorithms are used to analyze a song, various parameters of the song may be analyzed separately. Such parameters include, but are not limited to, tempo, frequency, sound pressure, energy, and any third-party information gathered from other databases which may have analyzed the acoustics of the particular song.

With respect to blocks 533-545, 548-560, and 563-575, the song categorization module 120 may review databases over the Internet for each song according to genre and popularity. The song categorization module may also apply natural language processing to social media feeds such as, but not limited to, TWITTER™ feeds, blog posts, webpages, websites (i.e.—FACEBOOK™, MYSPACE™, LINKED-IN™, pages, etc.) in order to gather information for individual songs (blocks 533-545), for albums (blocks 548-560), and for artists (blocks 563-575). Additionally, the song categorization module 120 in these blocks may also receive data from experts who have knowledge about how well a song, album, or artists relate to industries, genres, popularity, places, mood, etc. (item types in column 216 of table 214 of FIG. 2B).

Figure 6:
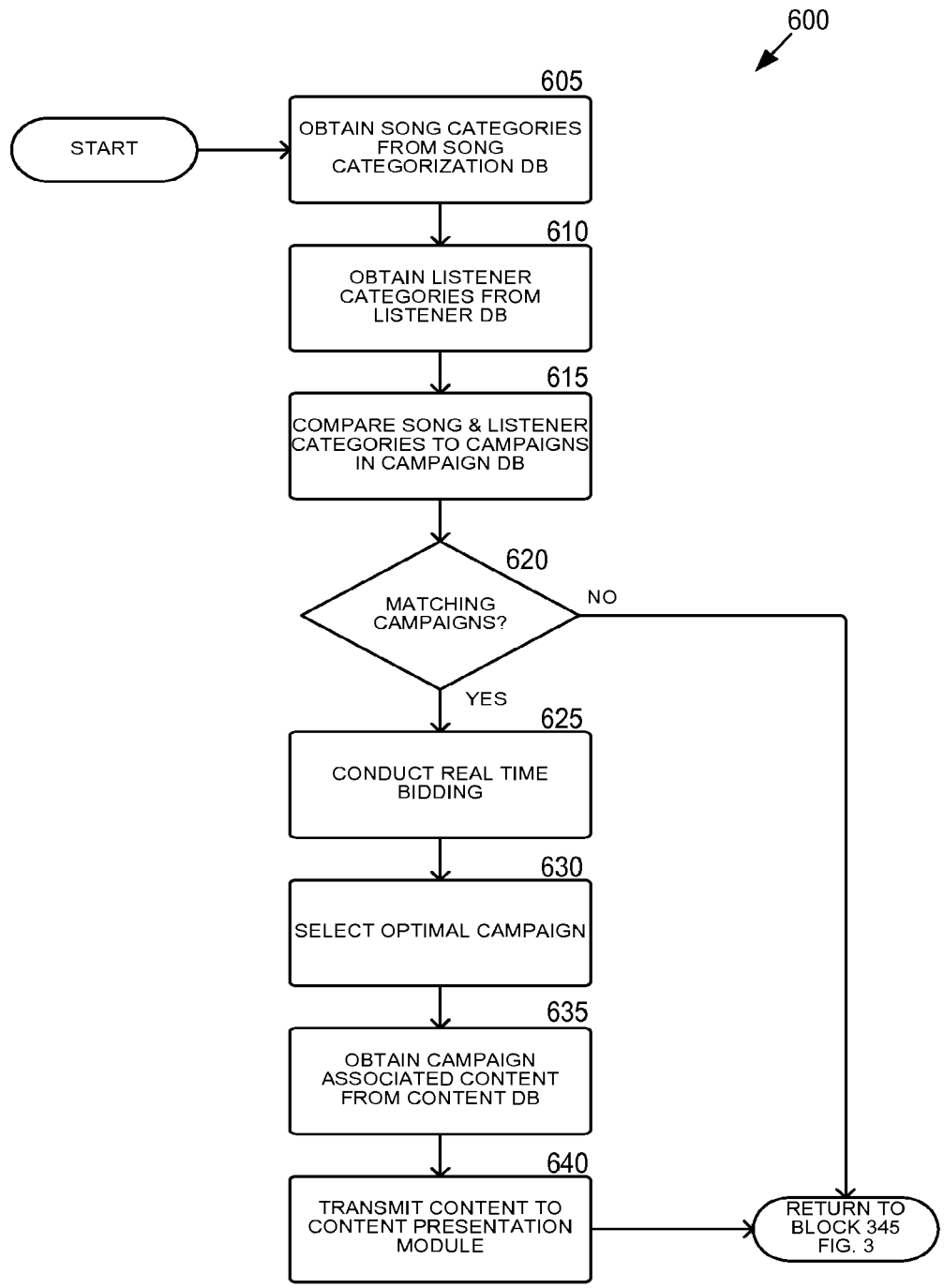
FIG. 6 is logical flowchart illustrating a submethod or routine of FIG. 3 for selecting content relevant to a particular song according to one exemplary embodiment.

FIG. 6 is a logical flow diagram illustrating a submethod or routine 600 of FIG. 3 for selecting content relevant to a particular song according to one exemplary embodiment. Block 605. is the first step of submethod or routine 600.

In block 605, the content selection module 108 obtain song categories from the song categorization database 118 which have been associated or deemed relevant to a particular song that is being played by the music subscriber on his or her portable computing device 100. Next, in block 610, the content selection module 108 obtain the listener categories associated with the music subscriber/listener in the listener knowledge database 112 based on the listener categorization subprocess or routine 400 of FIG. 4.

Next, in block 615, the content selection module 108 compares the data it retrieved from block 605 and 610 (from the song categorization database 118 and the listener knowledge database 112) to campaigns in the campaign database 116. Next, in decision block 620, the content selection module 108 determines if there are any matches.

For example, in decision block 620, the content selection module 108 may have data from the song categorization database 118 that reflects that the current song being played has a mood which is happy and addresses the industry of flowers. Meanwhile, data from the listener knowledge database 112 reflects that the listener is a male person who is thirty-eight years of age and is married. The current date reflects that it is Valentine's Day. With this data from databases 112, 118, the content selection module 108 will look for campaigns that match the industry of flowers and may be relevant to Valentine's Day.

If the inquiry to decision block 620 is positive meaning that one or more matches are found, then the "YES" branch is followed to block 625. If the inquiry to decision block 620 is negative, then the "NO" branch is followed in which the submethod 600 returns to block 345 of FIG. 3.

Usually, more than one match may be discovered with the content selection module 108 in which the "YES" branch is followed to block 625. In block 625, the content selection module 108 may conduct a real-time bidding process as understood by one of ordinary skill in the art. A real-time bidding process may include item weighting, such as illustrated in column 220 of table 214 of FIG. 2B, and other parameters as understood by one of ordinary skill in the art.

For example, suppose that ten campaigns from the campaign database 116 match one or more categories associated with the current song being played by the music subscriber on his or her portable computing device 100. The single campaign to be selected out of the ten campaigns should be one that yields the highest rate of return for the content provider. One or more algorithms as understood by one of ordinary skill the art may be used to conduct this real-time bidding process. Exemplary existing off-the-shelf software that exists as of this writing which may assist with the real-time bidding process includes APPNEXUS™ brand software. The real-time bidding process may follow one or more industry standards that may exist as of this writing. For example, one standard that may be followed is the Open Real-Time Bidding (RTB) standard, supported by IAB, that currently exists as of this writing.

Next, in block 630, the optimal campaign is selected by the content selection module 108 as a result of the real-time bidding process and based upon the parameters and criteria present in each campaign. Subsequently, in block 635, the content selection module queries the content database 110 for the content associated with the selected optimal campaign from block 630.

And in block 640, the content selection module 108 transmits the selected content to the content presentation module 102A for formatting and transmission across the computer network 142 to the content presentation model 102B residing on the portable computing device 100. The submethod/routine 600 then returns to block 345 of FIG. 3.

Figure 7:
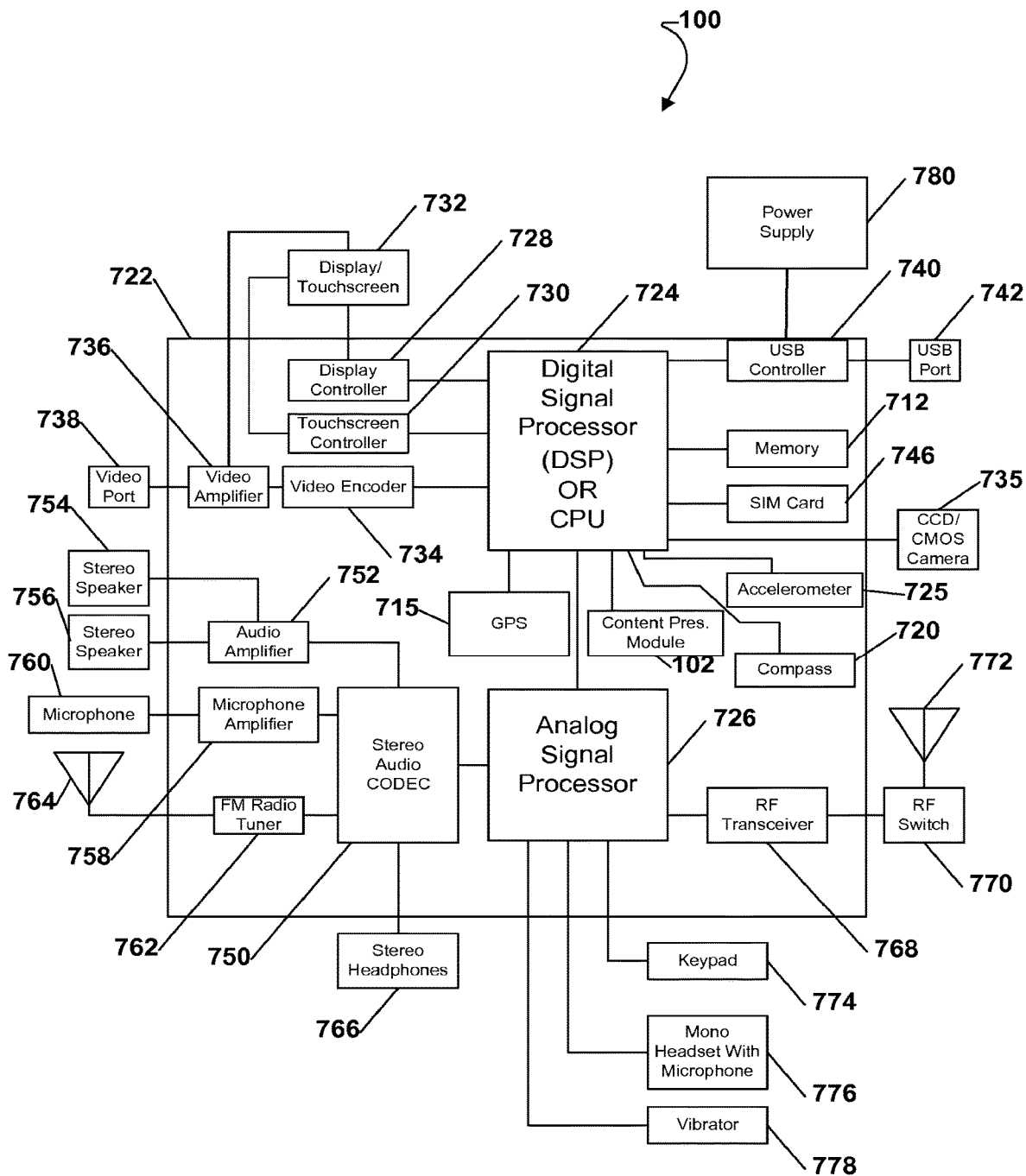
FIG. 7 is a functional block diagram of an exemplary, non-limiting aspect of a PCD in the form of a wireless telephone for implementing methods and systems identifying content relevant to a user based on contextual information from music and music player environmental factors.

FIG. 7 is a functional block diagram of an exemplary, non-limiting aspect of a PCD 100 in the form of a wireless telephone for use in identifying content relevant to a user based on contextual information from music and music player environmental factors. The PCD 100 of FIG. 7 corresponds to the PCD 100 of FIG. 1A.

As shown, the mobile telephone 100 includes an on-chip system 722 that includes a digital signal processor or a central processing unit 724 and an analog signal processor 726 that are coupled together. As illustrated in FIG. 7, a display controller 728 and a touchscreen controller 730 are coupled to the digital signal processor 724. A touchscreen display 732 external to the on-chip system 722 is coupled to the display controller 728 and the touchscreen controller 730.

FIG. 7 further illustrates a video encoder 734, e.g., a phase-alternating line ("PAL") encoder, a sequential couleur avec memoire ("SECAM") encoder, a national television system(s) committee ("NTSC") encoder or any other video encoder, is coupled to the digital signal processor 724. Further, a video amplifier 736 is coupled to the video encoder 734 and the touchscreen display 732. A video port 738 is coupled to the video amplifier 736. As depicted in FIG. 7, a universal serial bus ("USB") controller 740 is coupled to the digital signal processor 724. Also, a USB port 742 is coupled to the USB controller 740. A memory 712 and a subscriber identity module ("SIM") card 746 may also be coupled to the digital signal processor 724.

Further, as shown in FIG. 7, a digital camera 735 may be coupled to the digital signal processor 724. In an exemplary aspect, the digital camera 735 is a charge-coupled device ("CCD") camera or a complementary metal-oxide semiconductor ("CMOS") camera.

As further illustrated in FIG. 7, a stereo audio CODEC 750 may be coupled to the analog signal processor 726.

Moreover, an audio amplifier 752 may be coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation ("FM") radio tuner 762 may be coupled to the stereo audio CODEC 750. Also, a FM antenna 764 is coupled to the FM radio tuner 762. Further, stereo headphones 766 may be coupled to the stereo audio CODEC 750.

FIG. 7 further illustrates a radio frequency ("RF") transceiver 768 that may be coupled to the analog signal processor 726. An RF switch 770 may be coupled to the RF transceiver 768 and an RF antenna 772. The RF transceiver 768 may communicate with conventional communications networks 142.

As shown in FIG. 7, a keypad 774 may be coupled to the analog signal processor 726. Also, a mono headset with a microphone 776 may be coupled to the analog signal processor 726. Further, a vibrator device 778 may be coupled to the analog signal processor 726. FIG. 7 also shows that a power supply 780 may be coupled to the on-chip system 722. In a particular aspect, the power supply 780 is a direct current ("DC") power supply that provides power to the various components of the mobile telephone 101 that require power. Further, in a particular aspect, the power supply is a rechargeable DC battery or a DC power supply that is derived from an alternating current ("AC") to DC transformer that is connected to an AC power source.

FIG. 7 also shows that the mobile telephone 100 may include a global positioning system ("GPS") module 715. The GPS module 115 may comprise hardware and/or software. The GPS module 715 may be coupled to the processor 724. Also coupled to the processor 724 may be a compass 720, an accelerometer 725, and the content presentation module 102 described above.

As depicted in FIG. 7, the touchscreen display 732, the video port 738, the USB port 742, the camera 785, the first stereo speaker 754, the second stereo speaker 756, the microphone 760, the FM antenna 764, the stereo headphones 766, the RF switch 770, the RF antenna 772, the keypad 774, the mono headset 776, the vibrator 778, and the power supply 780 are external to the on-chip system 722.

In a particular aspect, one or more of the method steps described above (such as illustrated in FIGS. 3-6) may be stored in the memory 712 as computer program instructions. These instructions may be executed by the digital signal processor or central processing unit 724, the analog signal processor 726, or another processor, to perform the methods 300-600 described herein. Further, the processors, 724, 726, the memory 712, the instructions stored therein, or a combination thereof may serve as a means for performing one or more of the method steps described herein.

Figure 8:
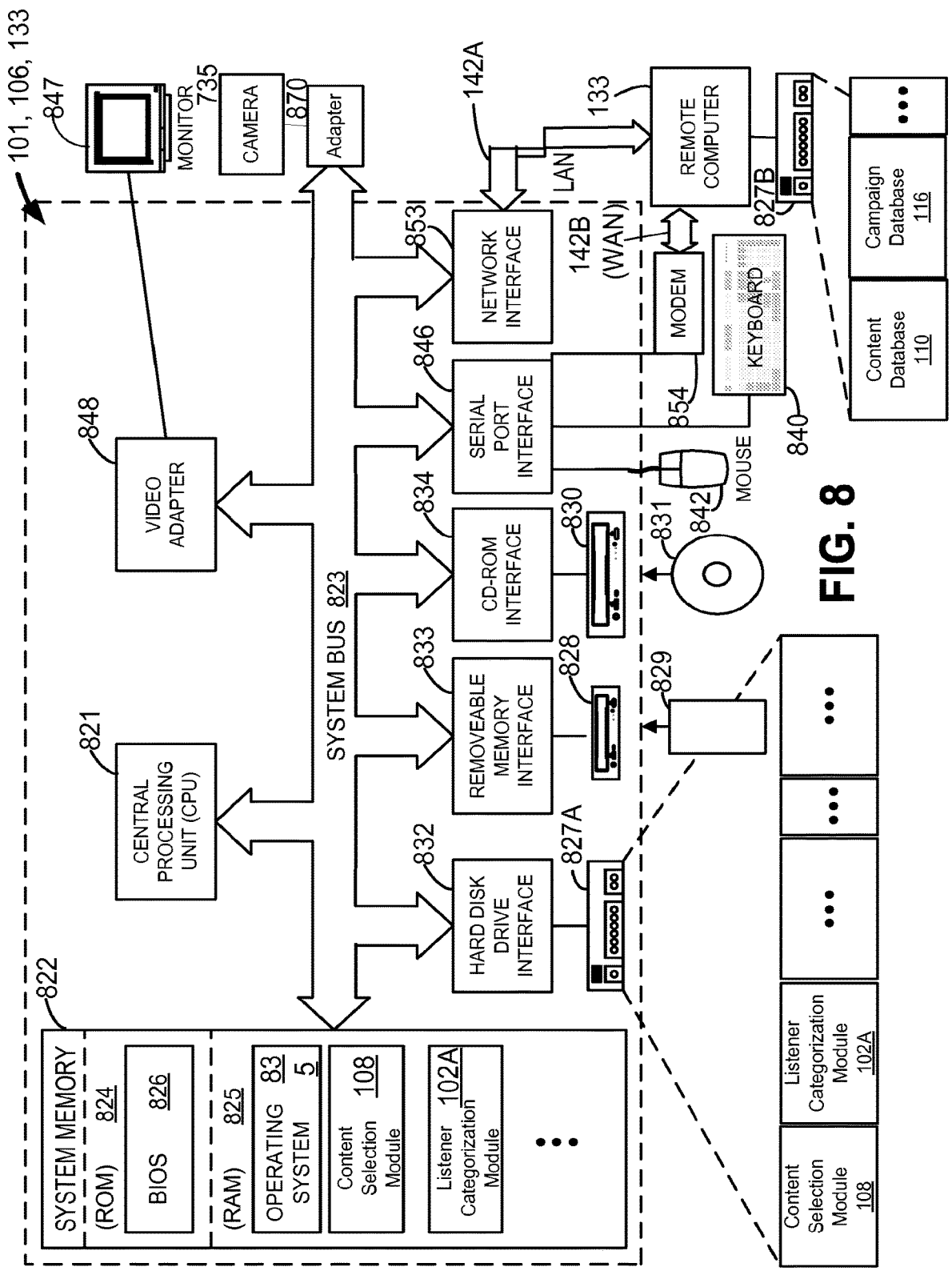
FIG. 8 is a functional block diagram of an exemplary, nonlimiting aspect of a general-purpose computer for implementing methods and systems for identifying content relevant to a user based on contextual information from music and music player environmental factors.

FIG. 8 is a functional block diagram of an exemplary, nonlimiting aspect of a general-purpose computer for implementing a method 300 for identifying content relevant to a user based on contextual information from music and music player environmental factors. The exemplary operating environment for the system 101 of FIG. 1A includes a general-purpose computing device in the form of this conventional computer 99, 106, and 133. This means that the content identifier and selection subsystem 99, the music database/streaming service provider 106, and the content producer 133 may all comprise general purpose computers.

Generally, a computer 99 includes a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes a read-only memory (ROM) 824 and a random access memory (RAM) 825. A basic input/output system (BIOS) 826, containing the basic routines that help to transfer information between elements within computer 99, such as during start-up, is stored in ROM 824.

The computer 99 can include a hard disk drive 827A for reading from and writing to a hard disk, not shown, a magnetic disk drive 828 for reading from or writing to a removable memory device 829, and an optical disk drive 830 for reading from or writing to a removable optical disk 831 such as a CD-ROM or other optical media. Hard disk drive 827A, memory device drive 828, and optical disk drive 830 are connected to system bus 823 by a hard disk drive interface 832, a removable memory interface 833, and an optical disk drive interface 834, respectively.

Although the exemplary environment described herein employs hard disk 827A, removable memory 829, such as a USB drive and/or flash memory, and removable optical disk 831, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet connected devices such as in cellular phones 100 and/or personal digital assistants (PDAs) 100.

The drives and their associated computer readable media illustrated in FIG. 8 provide nonvolatile storage of computer-executable instructions, data structures, program modules, and other data for computer 99. A number of program modules may be stored on hard disk 827, removable memory 829, optical disk 831, ROM 824, or RAM 825, including, but not limited to, an operating system 835, a content presentation module 102A, and a listener categorization module 114A.

Program modules include routines, sub-routines, programs, objects, components, data structures, etc., which perform particular tasks or implement particular abstract data types. Aspects of the present invention may be implemented in the form of a downloadable, content presentation module 102B which is executed by a mobile device 100 or computer 99 in order to identify content relevant to a user based on contextual information from music and music player environmental factors.

A user may enter commands and information into computer 99 through input devices, such as a keyboard 840 and a pointing device 842. Pointing devices may include a mouse, a trackball, and an electronic pen that can be used in conjunction with an electronic tablet. Other input devices (not shown) may include a microphone, joystick, game pad, satellite dish, scanner, or the like.

These and other input devices are often connected to processing unit 821 through a serial port interface 846 that is coupled to the system bus 823, but may be connected by other interfaces, such as a parallel port, game port, a universal serial bus (USB), or the like.

The display 847 may also be connected to system bus 823 via an interface, such as a video adapter 848. As noted above, the display 847 can comprise any type of display devices such as a liquid crystal display (LCD), a plasma display, an organic light-emitting diode (OLED) display, and a cathode ray tube (CRT) display.

The camera 735 may also be connected to system bus 823 via an interface, such as an adapter 870. As noted previously, the camera 735 can comprise a video camera such as a webcam. The camera 735 can be a CCD (charge-coupled device) camera or a CMOS (complementary metal-oxide-semiconductor) camera. In addition to the monitor 847 and camera 735, a computer 99 may include other peripheral output devices (not shown), such as speakers and printers.

The computer 99 may operate in a networked environment using logical connections to one or more remote computers, such as the content producer 133. The content producer 133 may be another personal computer, a server, a mobile phone 100, a router, a network PC, a peer device, or other common network node. While the remote computer 133 typically includes many or all of the elements described above relative to the computer 99, only a memory storage device 827B has been illustrated in FIG. 8.

The logical connections depicted in FIG. 8 include a local area network (LAN) 142A and a wide area network (WAN) 142B. Such networking environments are commonplace in offices, enterprise-wide computer networks, intranets, and the Internet.

When used in a LAN networking environment, the computer 99 is often connected to the local area network 142 through a network interface or adapter 853. When used in a WAN networking environment, the computer 99 typically includes a modem 854 or other means for establishing communications over WAN 142B, such as the Internet. Modem 854, which may be internal or external, is connected to system bus 823 via serial port interface 846. In a networked environment, program modules depicted relative to the content producer 133, or portions thereof, may be stored in the remote memory storage device 827B. It will be appreciated that the network connections shown are exemplary and other means of establishing a communications link 103 between the computers 99 and PCDs 100 may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Figure 9:
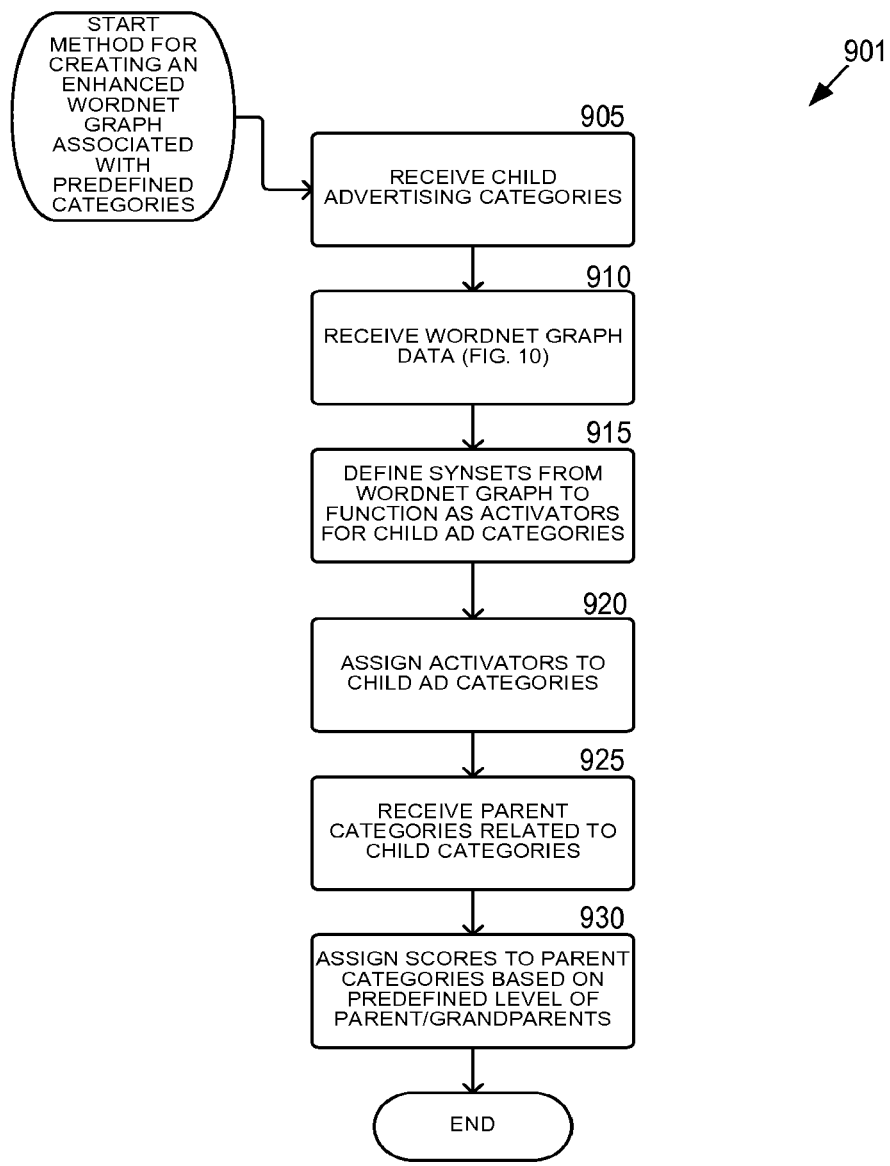
FIG. 9 is logical flowchart illustrating a method for creating an enhanced wordnet graph associated with pre-defined categories of information according to one exemplary embodiment.

Referring now to FIG. 9, this figure is logical flowchart illustrating a method 901 for creating an enhanced wordnet graph 1000 (see FIG. 10) associated with predefined categories of information according to one exemplary embodiment. These predefined categories may comprise Exhibit A on IAB contextual taxonomy, developed by IAB networks and exchanges of quality assurance guidelines version 1.5 which is available as of this writing and described in detail above.

This method 901 is executed by a WordNet setup software module 900 described below in connection with FIG. 16. The WordNet setup module 900 forms a portion of the lyric processing algorithm 509 as will be explained below in connection with FIG. 16.

Block 905 is the first block of method 901 of FIG. 9 and includes the WordNet setup module 900 receiving base or "child" advertisement categories and storing them in a database, such as lyrics database 122E illustrated in FIG. 1B. These base or "child" advertisement categories may comprise Exhibit A on IAB contextual taxonomy which includes many different advertisement categories and their interrelationships as understood by one of ordinary skill in the art.

Next, in block 910, the WordNet setup module 900 may then receive a WordNet graph. WordNet graphs currently exist as of this writing and are available for purchase. The WordNet graphs provide interrelationships between words as will be described in further detail below in connection with FIG. 10.

Subsequently, in block 915, synsets are defined to function as activators for the base advertisement categories received in block 905. Synsets will be described in further detail below in connection with FIGS. 10 and 11.

In block 920, the WordNet setup module 900 may then assign activators created in block 915 to base or child advertisement categories that were received in block 905. Further details about block 920 be described below in connection with FIG. 11.

Next, in block 925, the WordNet setup module 900 may receive parent categories relative to the base or child categories received in block 905. Subsequently, in block 930, the WordNet setup module 900 may assign scores to each of the parent advertisement categories received in block 925. Further details about the scoring of block 930 will be described below in connection with FIG. 12. The method 901 may then terminate.

Figure 10:
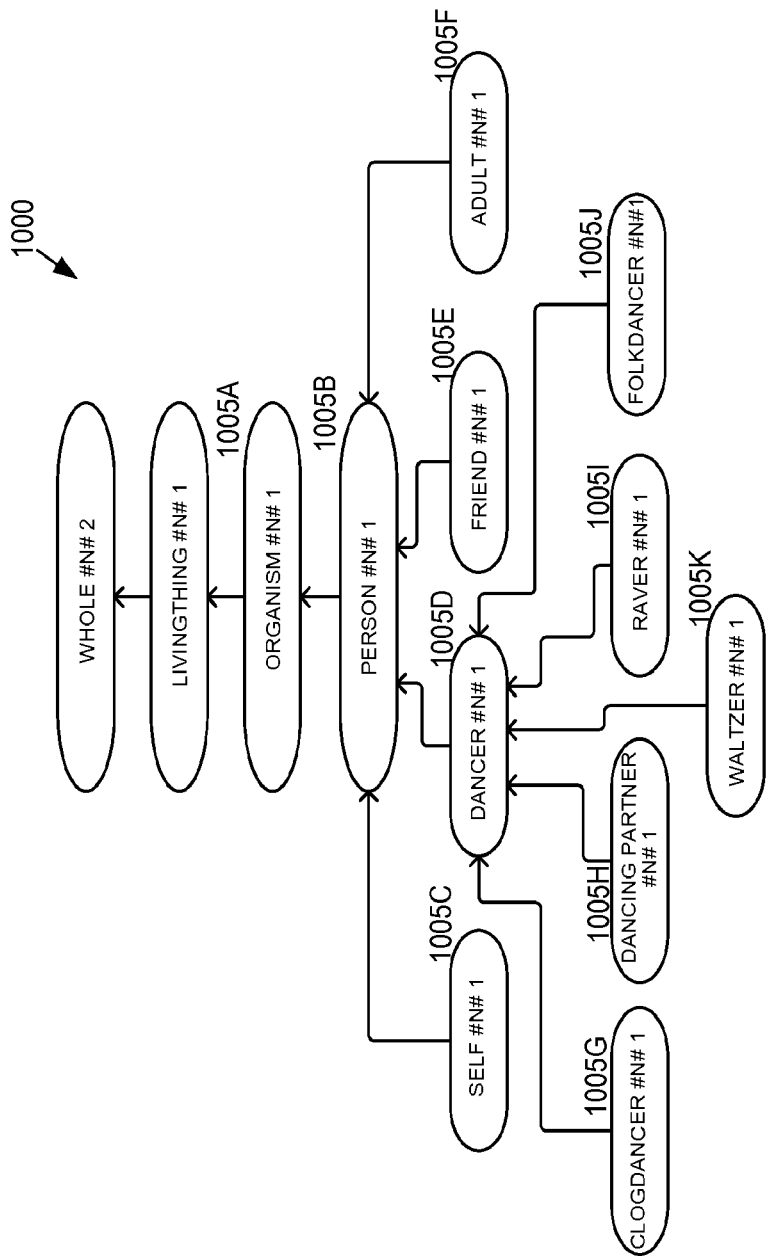
FIG. 10 illustrates an enhanced WordNet graph according to one exemplary embodiment.

FIG. 10 illustrates an enhanced WordNet graph 1000 according to one exemplary embodiment. A WordNet graph 1000 may comprise a tree of words 1005 which have predefined relationships as understood by one of ordinary skill in the art.

Words can have different meanings (senses) and disambiguation is the process of extracting the correct sense of the word based on the context (surrounding words). For example, the word "bank" used as a noun has at least two meanings—the bank of a river or the financial institution. Disambiguated forms of the words are known as synsets.

A synset is a particular sense of a word. Synsets uniquely identify a specific meaning of the word and use the following notation—"word#part-of-speech-abbreviation#index". For example, the two synsets for bank that we discussed above are represented as bank#n#1 (sloping land beside a body of water) and bank#n#2 (depository financial institution).

A WordNet is a large lexical database of English. Nouns (n), verbs (v), adjectives (a) and adverbs (r) are grouped into sets of cognitive synonyms (synsets), each representing a distinct sense. The synsets of the WordNet are interlinked by conceptual semantic and lexical relationships.

The most frequently encoded relation among synsets is the super-subordinate relation (also called hyperonymy, hyponymy, or ISA relation). The super-subordinate relation may link more general synsets like {furniture, piece_of_furniture} to increasingly specific ones like {bed} and {bunkbed}.

For hyponyms, a synset is a hyponym of another synset if the first synset is the more specific form of the second. For example, "bed#n#1," is a hyponym of "bedroom_furniture#n#1," which is a hyponym of "furniture#n#1." This means for nouns, starting from the root (entity), if one traverses the WordNet graph 1000 in a downward manner using hyponyms, one will get more and more specific synsets.

Referring specifically now to FIG. 10, a hyponym for the synset "organism#n#1" 1005A of the WordNet graph 1000 is the synset "person#n#1" 1005B which is one downward "hop" in the WordNet graph 1000 relative to synset 1005A. As noted previously, conventional language processing algorithms utilize hyponyms to infer relationships between synsets. However, according to the inventive lyric processing algorithm/system 509, hyponyms are not used at all to establish any relationships between synsets. This is but just one inventive aspect of the lyric processing algorithm/system 509.

Opposite to hyponyms are hypernyms. Hypernyms follow the opposite direction of traversal of the WordNet graph 1000 from hyponyms meaning that one can go from the bottom of the WordNet graph 1000 containing specific synsets 1005 to more and more general (parent) synsets 1005. So, "furniture#n#1" is a hypernym of "bedroom_furniture#n#1" which is in turn a hypernym of "bed#n#1". One can think of this as traversing the WordNet graph 1000 in an upward manner.

Specifically, referring to FIG. 10, the synset "organism#n#1" 1005A is the hypernym of the synset "person#n#1" 1005B when traversing a WordNet graph 1000 in an upward fashion starting from the synset "person#n#1" 1005B. The synset "organism#n#1" 1005A is one "hop" away relative to the synset "person#n#1" 1005B. The inventive lyric processing algorithm/system 509 tracks the number of "hops" away that an advertisement category may be relative to a word in lyric which may exist within the WordNet graph 1000. The inventive lyric processing algorithm/system 509 only tracks "hops" for hypernym relationships—from the specific to the broad or more "general" or "generic" meaning of a word. As noted above, this use of only hypernym relationships to determine relevant advertisement categories is yet but one inventive aspect of the system 509.

In the exemplary embodiment illustrated in FIG. 10, the synset "person#n#1" 1005B is the hypernym for the following for synsets: "self#n#1" 1005C; "dancer#n#2" 1005D; "friend#n#1" 1005E; and "adult#n#1" 1005F.

These four synsets 1005C-F may also be hypernyms for other synsets 1005. However, for the exemplary embodiment illustrated in FIG. 10, only the hyponym synsets 1005 associated with the hypernym synset "dancer#n#2" 1005D are illustrated. Stated differently, only a hypernym synset "dancer#n#2" 1005D of five other "child" synsets 1005G-K are illustrated. The "child" synsets 1005 where "parent" synsets 1005C, E, and F are hypernyms are not illustrated.

The five "child" synsets 1005G-K in which synset "dancer#n#2" 1005D is the "parent" hypernym include a "clogdancer#n#1" synset 1005G; a "dancingpartner#n#1" synset 1005H; a "raver#n#1" synset 1005I; a "folkdancer#n#1" synset 1005J; and a "waltzer#n#1" synset 1005K.

In the exemplary embodiment illustrated in FIG. 10, the synset "dancer#n#2" 1005D has been assigned or designated as an activator for the advertisement category "dance" 1102A as indicated by the dashed line originating from the synset "dancer#n#2" 1005D. Additional and different advertisement categories may be assigned to various synsets 1005 of the WordNet graph 1000 illustrated in FIG. 10 as understood by one of ordinary skill the art. As will be discussed below, the inventive system 509 and method 1300 (described below) are not limited to categories which only involve advertising. This disclosure may be applicable to other areas beyond advertising as understood by one of ordinary skill the art. For example, the language processing described herein may be applicable to creating databases for medical terms, business terms, books, etc.

Figure 11:
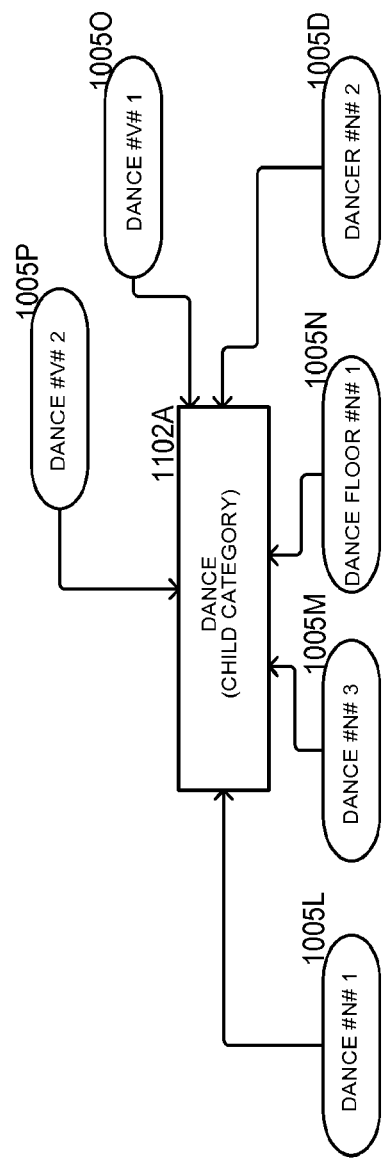
FIG. 11 illustrates activators that may comprise synsets from WordNet graph of FIG. 10.

Referring now to FIG. 11, this figure illustrates activators that may comprise synsets from WordNet graph of FIG. 10. In this exemplary embodiment, the advertisement category for the word "DANCE" 1102A has been assigned six synsets 1005 which function as activators for indicating that the dance category 1102A may be relevant. Specifically, the six synsets 1005 assigned as activators for the dance category 1102A are as follows: synset "dance#n#1" 1005L; synset "dance#n#3" 1005M; synset "dancefloor#n#1" 1005N; synset "dancer#n#2" 1005D; synset "dance#v#1" 1005O; and synset "dance#v#2" 1005P.

As noted previously, the synset "dancer#n#2" 1005D is part of the WordNet graph 1000 FIG. 10. So this means, if a lyric of a song has a noun of "dancer" which corresponds with a second definition assigned to the "dancer#n#2" synset 1005D, then the dance category 1102A may be considered for relevancy by method 1300 as will be described in further detail below. Further, if a lyric of a song has a synset 1005 that is within a predetermined range of "hops" relative to the "dancer#n#2" synset 1005D which functions as an activator for the dance category 1102A, then this synset 1005 may be considered for relevancy by the method 1300 that will be described in further detail below.

For example, referring briefly back to FIG. 10, suppose a lyric of a song contains the noun of "raver" and is used in the song according to the definition assigned to the synset "raver#n#1" 1005I, then this means that this use of the noun of "raver" is one "hop" away from the activator synset "dancer#n#2" 1005D which triggers the dancer advertisement category 1102A. Further details about how close in terms of "hops" that synsets 1005 need to be relative to a synset 1005 functioning as an activator will be described below in connection with FIGS. 13 and 14.

Figure 12:
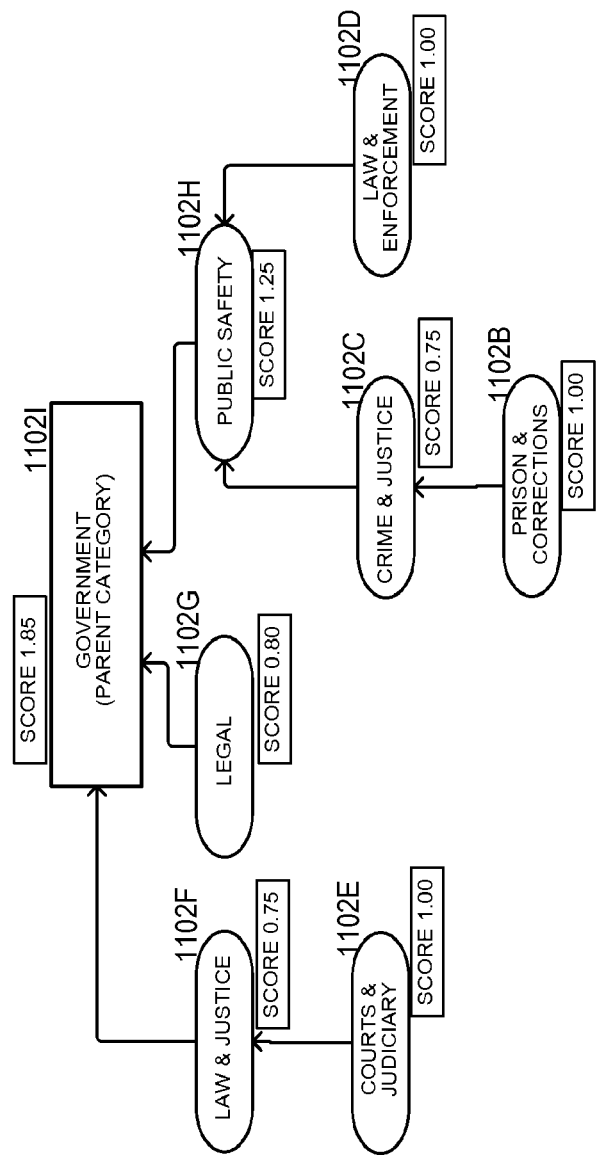
FIG. 12 illustrates an exemplary WordNet graph of parent categories relative to child categories which has predefined scoring assigned to each element of the graph.

Referring now to FIG. 12, this figure illustrates an exemplary WordNet graph 1200 of parent categories 1102 relative to child categories 1102 which has predefined scoring assigned to each element of the graph 1200. In the exemplary embodiment illustrated in FIG. 12, the prisons and corrections category 1102B may be characterized as a "child" category relative to the "parent" category of criminal and justice 1102C.

Meanwhile, the category of criminal and justice 1102C may be characterized as the "child" category relative to the "public safety" category 1102H. Similarly, the category of "public safety" 1102H may be considered as the child category relative to the "parent" category of government 1102H.

The government category 1102H is the "parent" relative to its "child" categories of "Law and Justice" 1102F, "Legal" 1102G, and "public safety" 1102H mentioned previously. The law and justice category 1102F has a single "child" category of courts and Judiciary 1102E. The legal category 1102G has no "children" or associated "child" categories, while the category of public safety 1102H has at least two "child" categories of crime and justice 1102C and the category of law enforcement 1102D.

These relationships between child and parent categories 1102 may be provided to the WordNet set up module 900 for executing method 901 illustrated in FIG. 9 as described above. The WordNet set up module 900 further generates scoring for each of the parent and child categories 1102 which is another inventive aspect of the inventive system 509 and method 1300.

Each of the lowest "children" categories are assigned a numerical score of (1.0). In the exemplary embodiment illustrated in FIG. 12, there are four "lowest" children which include the courts and Judiciary category 1102E, the prisons and corrections category 1102B, the law enforcement category 1102B and the Legal category.

The law and justice category 1102F and crime and justice category 1102C are assigned a numerical value of (0.75). Meanwhile, the legal category 1102G is assigned a numerical value of (0.80). The public safety category 1102H is assigned a numerical value of (1.25) while the government category 1102I is assigned a numerical value of (1.85).

The scores for each of these categories 1102 in this parent-child advertisement category WordNet graph 1200 are derived as follows: each parent category 1102 is assigned a score based on the number and depth of its lowest children. The score of each lowest child is multiplied a depth multiplier. Meanwhile, any parent category 1102 which docs not have any "children" is assigned a synset score derived from the flow chart/method of FIG. 14.

In the exemplary embodiment illustrated in FIG. 12, the maximum depth for a lowest child that is considered is three (3) or three "hops" down from a respective parent category 1102. One of ordinary skill in the art will recognize that other depths or distances for lowest children may be selected without departing from the scope of this disclosure.

For the maximum child depth of three, if a lowest child along path or line relative to the parent is one "hop" away from a parent, then its value/score is multiplied by a value of (0.75). If a lowest child along path or line relative to the parent is two "hops" away from a parent, then its value/score is multiplied by a value of (0.50). If a lowest child along path or line relative to the parent is three "hops" away from a parent, then its value/score is multiplied by a value of (0.25).

The scores of the parent-child category wordnet graph 1200 are calculated starting from the lowest children in the graph 1200 and working your way up to the top or highest parent. This means that each of the lowest "children" categories 1102E, 1102B, and 1102D is assigned a value of (1.0) since these children have no children.

Next, the category 1102F is assigned a value of (0.75) since it has one child category 1102E with a value of (1.0). The calculation for category 1102F is as follows: (0.75×1.0), where 0.75 is assigned as the depth multiplier because the child category 1102E is one "hop" away from the parent category 1102F.

Similarly, the category 1102C is assigned is assigned a value of (0.75) since it has one child category 1102B with a value of (1.0). The calculation for category 1102C is as follows: (0.75×1.0), where 0.75 is assigned as the depth multiplier because the child category 1102B is one "hop" away from the parent category 1102C.

The category 1102G is assigned a value of (0.80). This value may be assigned at set-up and automatically by the system or manually. Since category 1102G does not have any children, it may be assigned an arbitrary value which is usually less than other categories 1102 which may have children categories.

The category 1102H is assigned a value of (1.25) since it has two lowest children categories 1102B and 1102D having values of (1.0). The calculation for category 1102H is as follows: (0.5×1.0)+(0.75×1.0), where 0.5 is assigned as the depth multiplier for child category 1102B (having a score of 1.0), because child category 1102B is two "hops" away from the parent category 1102H; and where 0.75 is assigned as the depth multiplier for child category 1102D (having a score of 1.0) because child category 1102D is one "hop" away from the parent category 1102H.

The category 1102I is assigned a value of (1.85) since it has four lowest children categories 1102E, 1102G, and 1102B, and 1102D, where each lowest child has values of (1.0), (0.8), (1.0), and (1.0). The calculation for category 1102I is as follows: (0.5×1.0)+(0.75×0.8)+(0.25×1.0)+(0.5×1.0), where 0.5 is assigned as the depth multiplier for child category 1102E (having a score of 1.0), because child category 1102E is two "hops" away from the parent category 1102I; where 0.75 is assigned as the depth multiplier for child category 1102G (having a score of 0.8) because child category 1102G is one "hop" away from the parent category 1102I; where 0.25 is assigned as the depth multiplier for child category 1102B (having a score of 1.0) because child category 1102B is three "hops" away from the parent category 1102I; and where 0.5 is assigned as the depth multiplier for child category 1102D (having a score of 1.0) because child category 1102D is two "hops" away from the parent category 1102I.

One of ordinary skill in the art will recognize that other depths or distances for lowest children of graph 1200 may be selected without departing from the scope of this disclosure. Other depths may be smaller or longer relative to the exemplary embodiment presented in FIG. 12.

Figure 13:
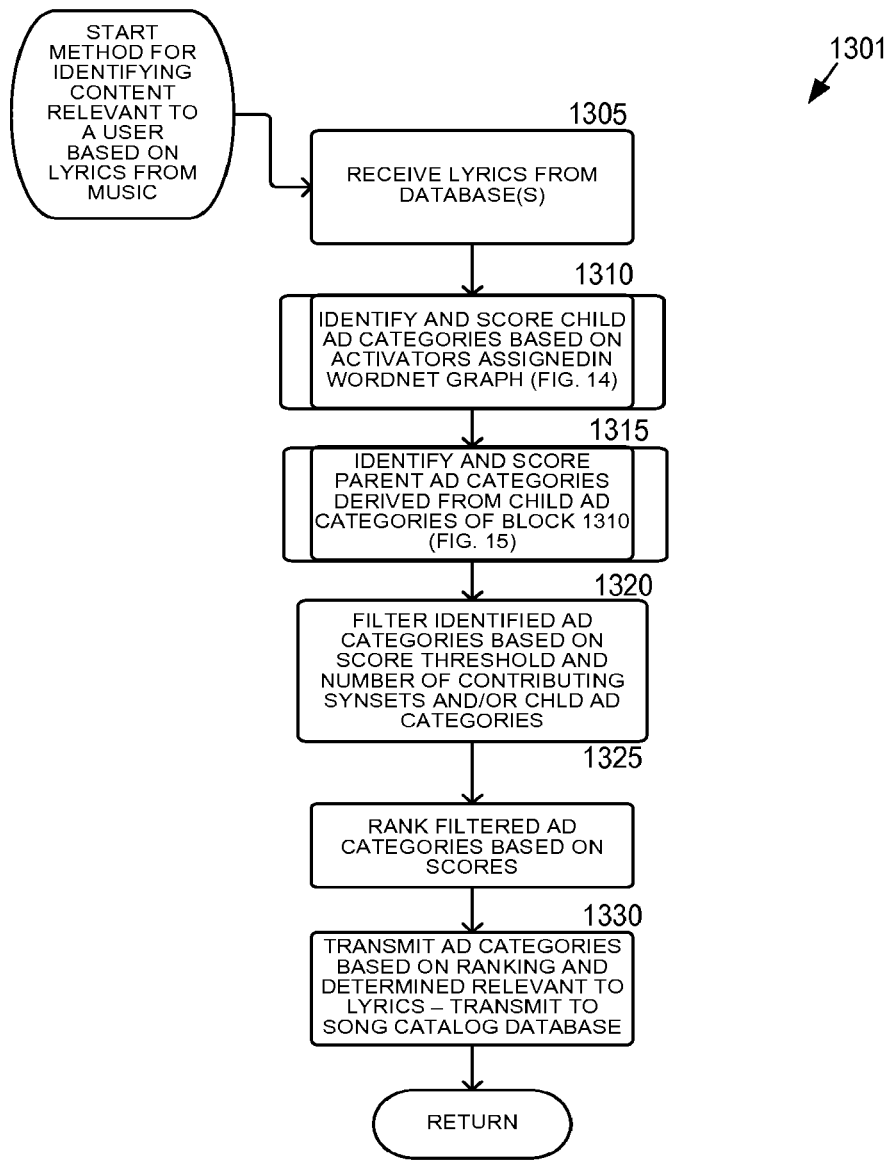
FIG. 13 is a logical flowchart illustrating a method for identifying content relevant to a user based on lyrics from music according to one exemplary embodiment.

FIG. 13 is a logical flowchart illustrating a method 1301 for identifying content relevant to a user based on lyrics from music according to one exemplary embodiment. Method 1300 generally corresponds with the lyric processing algorithm 509 illustrated in FIG. 5 and lyric scoring module 1300 described below in connection with FIG. 16.

Block 1305 is the first block of method 1301. In block 1305, the lyrics of a song may be received by the activator module 1400. As noted previously, while one focus of the lyric processing of the inventive system 101 is on the music industry and how to identify relevant advertising with respect to music, the inventive system 101 is not limited to this exemplary application. Many of the lyric processing algorithms described herein may be used in other areas, such as, but not limited to legal applications, medical applications, government applications, for linking categorized information with raw data from cases, books, field data, etc.

Next, in routine block 1310, advertisement categories in musical lyrics are identified and scored based on the activators described above in connection with FIG. 11. Further details of this routine block/submethod 1310 will be described below in connection with FIG. 14. Routine block/submethod 1310 may be executed by an activator software module 1400 that is described below in connection with FIG. 16.

Subsequently, in routine block 1315, parent advertisement categories are identified and scored relative to the ad categories found in routine block 1310. This routine block 1315 generally corresponds with the exemplary WordNet graph 1200 of parent categories 1102 of FIG. 12. Further details about routine/submethod block 1315 will be described below in connection with FIG. 15. Routine block/submethod 1315 may be executed by a parent/child category module 1500 that is described below in connection with FIG. 16.

After routine block 1315, in block 1320, the advertisement categories discovered by routine blocks 1310 and 1315 are filtered based on scoring thresholds and a number of contributing synsets and/or child advertisement categories.

An example of filtering based on a score threshold may include assigning a score threshold of "0.8." Such a threshold value means that a song has at least one synset 1005 that is directly mapped to an advertising category 1102 or is one hop away. The song could also have two synsets 1005 that are indirectly mapped to the advertising category 1102 and together make up a score of 0.8 or more. This threshold is configurable/adjustable.

Filtering may also be based on number of child advertising categories 1102 or synsets 1105. For example, an ad category 1102 may be triggered/identified only if at least two synsets 1005 in the song can be traced to activators for the advertising category 1102. Similarly for child advertising categories 1102 having at least two direct children categories 1102 may be a threshold to trigger a parent ad category 1102.

Referring back to FIG. 13, next, in block 1325, the filtered advertisement categories from block 1315 are ranked by the lyric scoring module 1300 based on their scores. In block 1330, this ranked list of advertisement categories is transmitted to the song categorization module 120 of FIG. 1B which then stores the data in the song categorization database 118 so that the categories are available for selection by the content selection module 108 and available for review by the content provider/advertiser 133. The process then ends.

Figure 14:
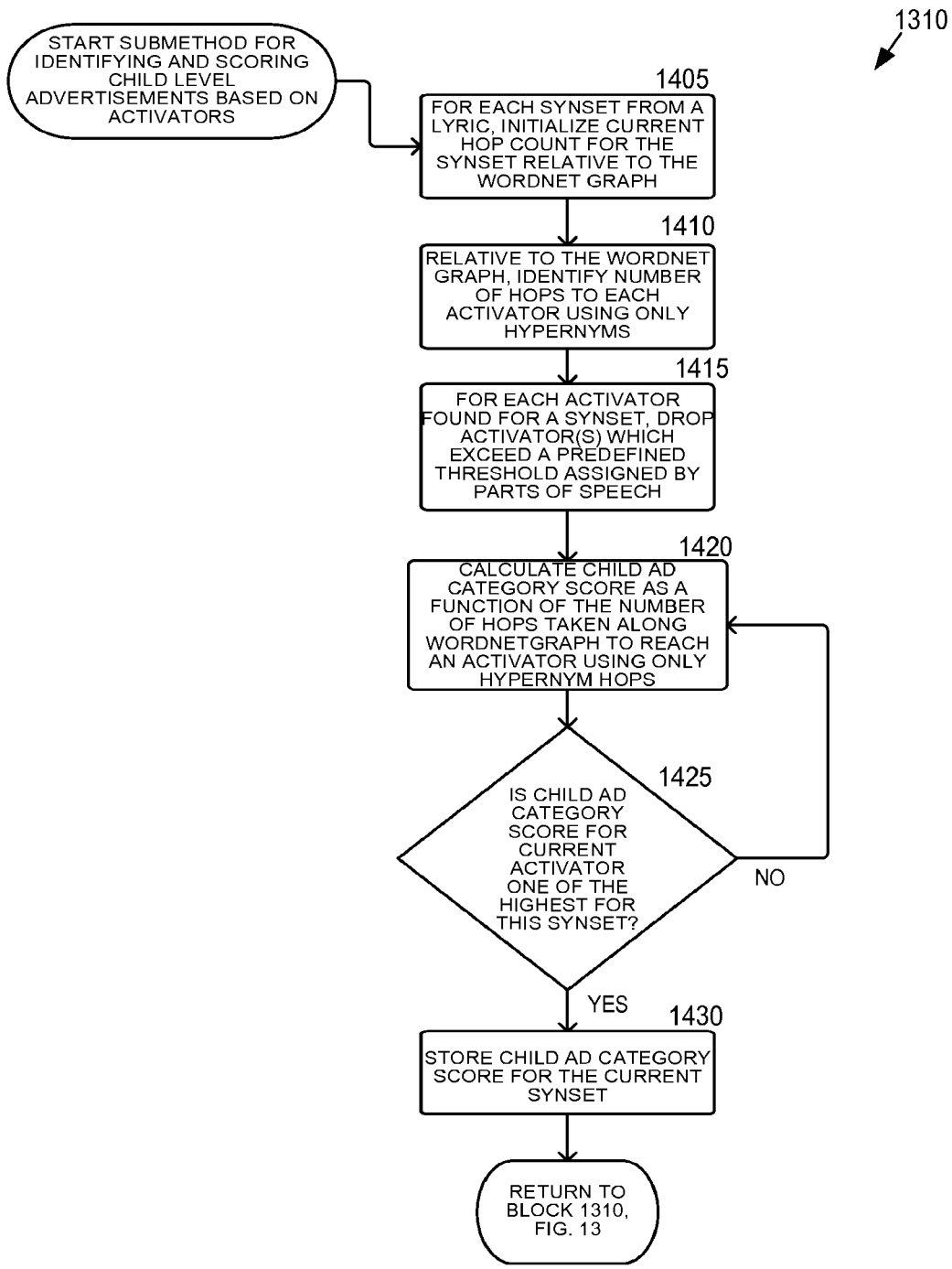
FIG. 14 is a logical flowchart illustrating a sub method or routine of FIG. 13 for identifying and scoring child level advertisement categories based activators assigned to the elements of a WordNet graph according to one exemplary embodiment.

FIG. 14 is a logical flowchart illustrating a submethod or routine 1310 of FIG. 13 for identifying child level advertisement categories based on activators assigned to the elements of a WordNet graph, such as the WordNet graph 1000 of FIG. 10, according to one exemplary embodiment. Block 1405 is the first step of submethod 1310. For each synset 1005 taken from a lyric of a song, initialize a current hop count for the synset 1005 such that it is equal to zero relative to the WordNet graph 1000 of FIG. 10.

Next, in block 1410, relative to the exemplary WordNet graph 1000 illustrated in FIG. 10, the number of "hops" needed to each activator contained within the WordNet graph 1000 for each synset 1005 of a song lyric is tracked by activator model 1400 using only hypernym type relationships between synsets 1005 of the WordNet graph as illustrated in FIG. 10. As noted previously, at least one inventive aspect of the inventive lyric processing algorithm 509 is that only hypernym type relationships are used between synsets 1005 within the WordNet graph 1000 FIG. 10. This is significant because conventional algorithms typically use other relationships besides hyperyms such as hyponyms (which means going from a "broad" term to a "narrow" term as described above).

As an example of the processing for block 1410, and referring now to FIG. 10, suppose the current song being analyzed has lyrics that contain the synset of "raver#n#1" 1005I. According to block 1410, the lyric scoring module 1300 executing submethod 1310 keeps track of the number of "hops" that a particular synset 1005, such as "raver#n#1" 1005I, has relative to an activator. As discussed previously with respect to the exemplary WordNet graph 1000 of FIG. 10, it was explained that the synset "dancer#n#2" 1005D of FIG. 10 has been designated as an activator for the advertisement category "Dance" 1102A as illustrated in FIG. 11.

Referring back to FIG. 10, the synset "raver#n#1" 1005I is one "hop" away from the activator synset "dancer#n#2" 1005D. This "hop" number is used by the lyric scoring module 1300 to calculate the score for the synset "raver#n#1" 1005I.

Referring back to FIG. 14, and subsequently in block 1415, for each activator which is found for a particular synset 1005, activators which exceed a threshold assigned according to parts of speech may be dropped by the activator module 1400. According to one exemplary embodiment, the maximum number of "hops" from a synset 1005 of interest to an activator may be set equal to five hops for nouns, four hops verbs, four hops for adjectives, and four hops for adverbs. However, one of ordinary skill in the art will appreciate that other thresholds may be established without departing from the scope of this disclosure. For example, thresholds which are higher in number or thresholds which are lower in number are well within the scope of this disclosure.

Next, in decision block 1420, an advertisement category score is calculated for each advertisement category corresponding to each activator. This advertisement category score may be a function of the number of "hops" taken along the WordNet graph 1000 from a particular synset 1005 to an activator using only hypernym types of hops. As noted previously, at least one inventive aspect of the lyric processing algorithm 509 is that only hypernym types of relationships within a WordNet graph 1000 are considered for calculating scores for relevant content with respect to a song lyric. As discussed above, the inventive algorithm 509 is not limited to song lyrics and music for determining advertising. The inventive algorithm 509 may be applicable to any topics of interest which utilize words and predefined relationships such as WordNet graphs 1000 and parent-child graphs 1200.

According to one exemplary embodiment, an advertisement category score may be calculated according to equation one (EQ1) provided below:

$$\text{SCORE} = 1 - (0.20 \times \text{HOPNUMBER}) \times (\text{SQRT}(\text{Number of times synset occurs in lyric})). \quad (EQ1)$$

Other equations for calculating an advertisement score are possible. Other equations are well within the scope of this disclosure.

Referring now to decision block 1425, the activator module 1400 may determine if the advertisement category score for the current activator is one of the highest for the particular synset 1005 being evaluated. According to one exemplary embodiment, a single high score for a particular synset 1005 may be maintained by the activator module 1400. However, in other exemplary embodiments, the activator module 1400 may maintain a plurality of "higher" scoring advertisement category. For example, the activator module 1400 may track the top three advertisement categories associated with the synsets 1005. This means that those advertisement categories which have scores which are lower than the top three advertisement categories may be dropped.

If the inquiry to decision block 1425 is negative, then the "NO" branch is followed back to decision block 1420. If the inquiry to decision block 1425 is positive, then the "YES" branch is followed to block 1430 in which the one or more "higher" scoring advertisement categories may be stored for the current synset 1005 being evaluated by the activator module 1400. Submethod 1310 then returns to routine block 1315 of FIG. 13.

Figure 15:
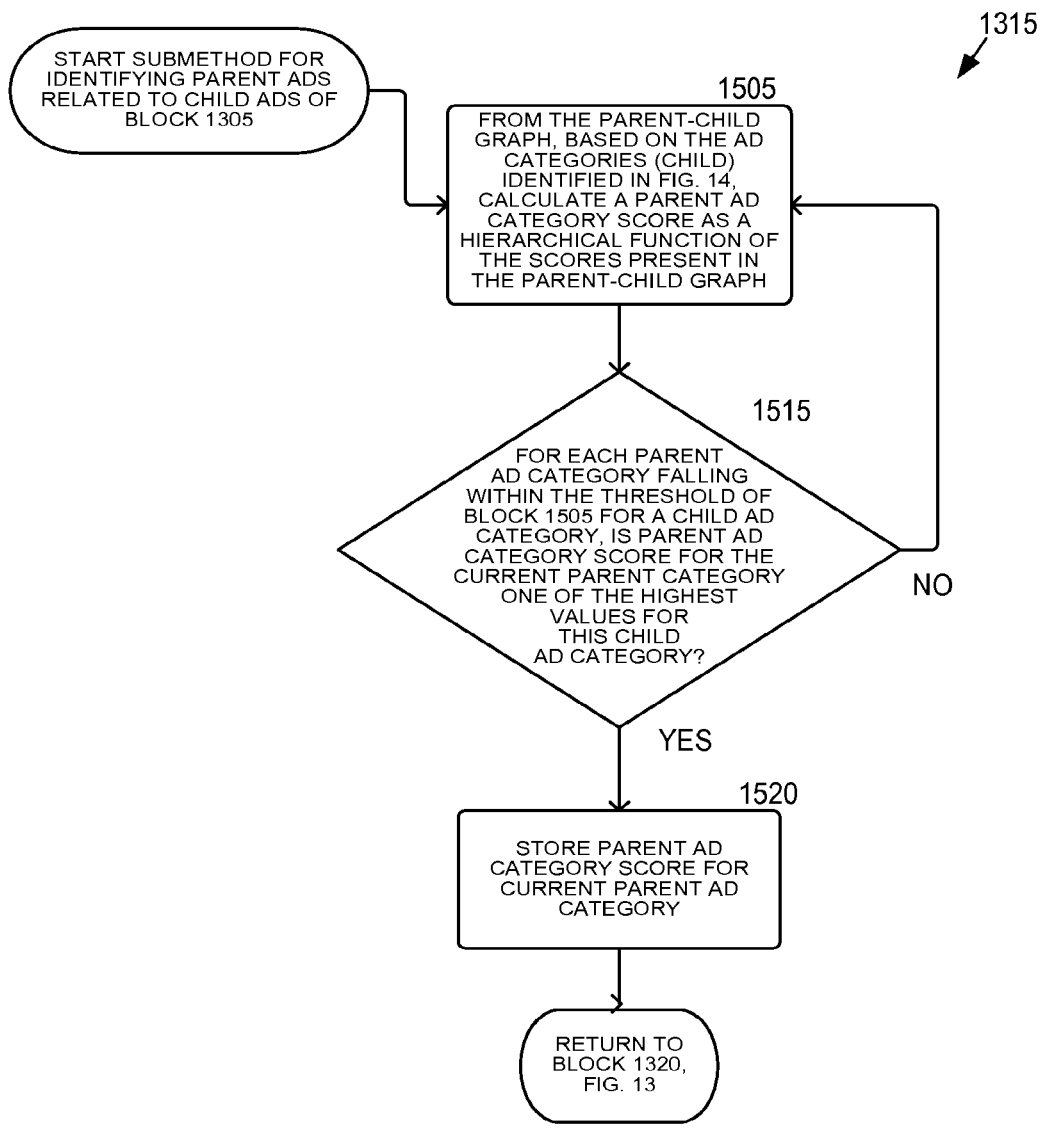
FIG. 15 is a logical flowchart illustrating a sub method or routine of FIG. 13 for identifying parent advertisements categories based on a predefined scoring of parent categories.

FIG. 15 is a logical flowchart illustrating a submethod or routine 1315 of FIG. 13 for identifying parent advertisements categories based on a predefined scoring of parent categories and their relationships with "child" advertisement categories identified by routine 1310 of FIG. 14. Block 1505 is the first step of routine 1315 illustrated in FIG. 15.

In block 1505, from the parent-child graph 1200 illustrated in FIG. 12 and based on the advertisement categories identified by routine 1310 of FIG. 14, the parent-child category module 1500 may calculate parent advertisement category scores as a hierarchal function of the scores present in the parent-child graph 1200 of FIG. 12. According to one exemplary embodiment, a predefined threshold may be applied to parent advertisement categories of FIG. 15 relative to child categories was identified based on routine 1310 of FIG. 14. In one exemplary embodiment, this predefined threshold may be a value of three.

Referring briefly to FIG. 12, this means that if the prisons and corrections child category 1102B was selected by routine 1310 of FIG. 14, then its highest parent can only be the government parent category 1102I. Any parent category 1102 which is "higher" in the word graph 1200 relative to the government parent category 1102I, would not be considered when this threshold is set equal to three because the government parent category 1102I is exactly three "hops" away or from the prisons and corrections child category 1102B as illustrated in FIG. 12.

Referring back to FIG. 15, then in decision block 1515, the parent-child category module 1500 may determine for each parent advertisement category 1102 falling within the threshold of block 1510 for a particular child advertisement category 1102, if a particular parent advertisement category score relative to a specific child advertisement category 1102 is one of the highest that has been reviewed. This decision block 1515 may track a plurality of higher score parent advertisement categories 1102 relative to a particular child advertisement category 1102. For example, the parent-child category module 1500 may track the top two or three parent advertisement categories for a particular, single child advertisement category 1102. In other exemplary embodiments, the parent-child category module 1500 the only track a single high score parent advertisement category 1102 for a particular child advertisement category 1102.

If the inquiry to decision block 1515 is negative, then the "No" branch may be followed back to block 1510. If the inquiry to decision block 1515 is positive, then the "Yes" branch may be followed to block 1520. In block 1320, the parent-child category module 1500 may store the one or more parent advertisement category scores 1102 for the current child advertisement category 1102 being evaluated. Submethod or routine 1315 then returns back to block 1320 of FIG. 13.

Figure 16:
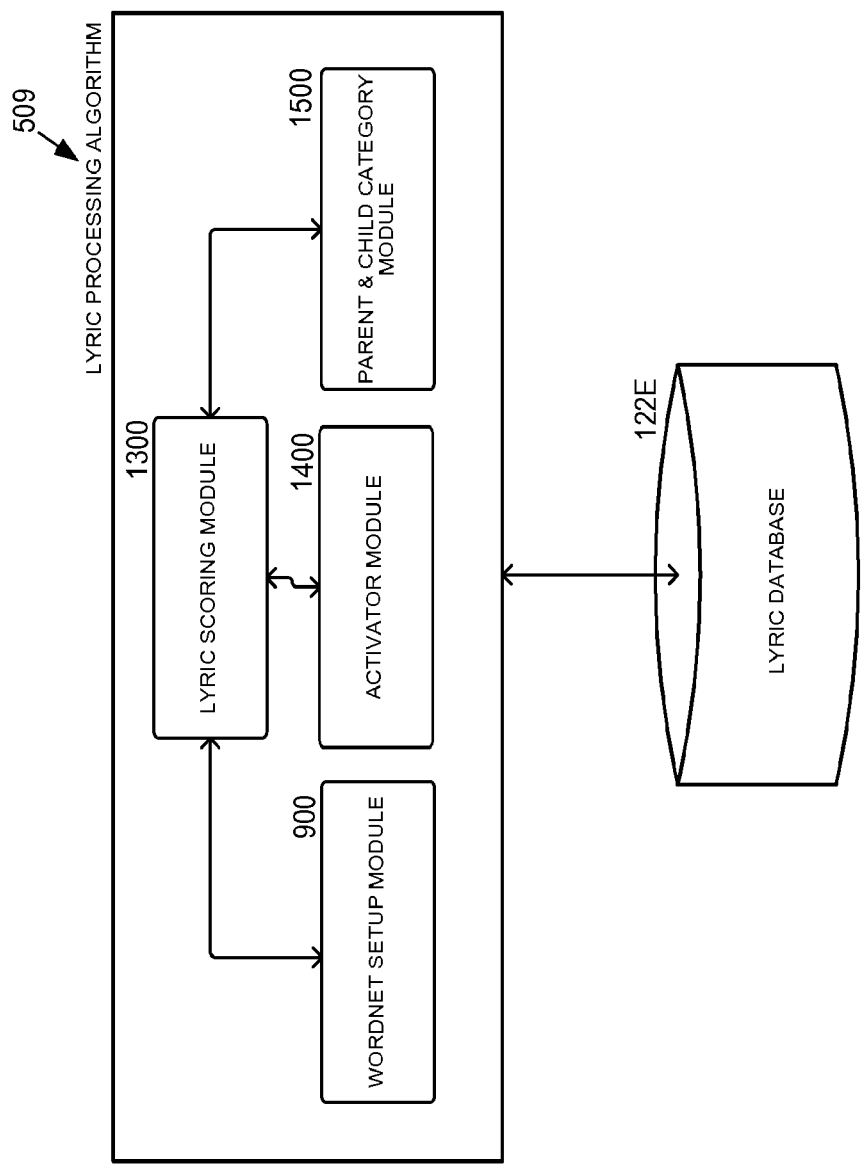
FIG. 16 is an exemplary functional block diagram illustrating software architecture details for one exemplary embodiment of the lyric processing algorithm block of FIG. 5.

FIG. 16 is an exemplary functional block diagram illustrating software architecture details for one exemplary embodiment of the lyric processing algorithm block 509 of FIG. 5. The lyric processing algorithm block 509 may comprise a lyric scoring module 1300, a wordnet setup module 900, an activator module 1400, and a parent-child category module 1500. The lyric scoring module 1300 may execute method 1301 described above. Similarly, the activator module 1400 may execute submethod or routine 1310 while the parent-child category module 1500 may execute the submethod or routine 1315 of FIG. 15. However, one of ordinary skill the art will appreciate that the modules 1300, 1400, and 1500 may be organized differently in that fewer modules may be used to execute the same number of methods/routines. Similarly, additional modules may be used to execute portions of each of the three methods described above.

The WordNet set up module 900 execute method 901 of FIG. 9 in which the WordNet graph 1000 of FIG. 10 is established and the activators 1005 are assigned to their respective advertisement categories 1102A as illustrated in FIG. 11. Method 901 also establishes the parent-child advertisement scores as illustrated in FIG. 12. The WordNet set up module 900 may communicate its data to the lyric scoring module 1300 as well as storing the data in the lyric database 122E. The lyric database 122E of FIG. 16 is the same lyric database 122E of FIG. 1B.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method of distributing advertising content relevant to text of a lyric of a song over a network to a remote subscriber portable computing device, the method, executed by a microprocessor of a transmission server coupled to memory, comprising:

provproviding a song playing application to a subscriber for installation on the remote subscriber portable computing device;

receiving advertising data at the transmission server sent from a data source over the Internet, the advertising data including a set of child categories, wherein the child categories comprise categories of advertising; the advertising data further including a word graph; the advertising data also including a set of parent categories relative to the set of child categories, wherein the parent categories comprise categories of advertising;

wherein the microprocessor of the transmission server:

assigns synsets from the word graph to function as activators for one or more categories of advertising; assigns one or more scores to the set of parent categories based on their relationships to the set of child categories, each score comprising a numerical value that is determined based on at least one of a number of child categories relative to a respective parent category and a depth of child categories relative to a respective parent category; each parent category is assigned a score based on a number and depth of its lowest children; wherein scores for child categories are calculated by starting from the lowest children in a graph and progressing upwards in the graph towards a parent;

compares synsets from the lyric of the song to the word graph by initializing a current hop count for each synset relative to the word graph, the current hop count comprising a numerical value;

identifies child categories relevant to the lyric of the song based on synsets which match one or more activators, by using only hypernym relationships between a synset from a song and an activator;

stores the identified child categories relevant to the lyric of the song in a song categorization database;

filters the identified child categories in the song categorization database and listener categories in a listener database;

selects advertising content based on the filtering step;

generates an electronic advertising alert based on the filtered data and selected advertising content steps;

formats the electronic advertising alert into data blocks according to formatting data; and transmits the formatted electronic advertising alert over a wireless communication channel to the remote subscriber portable computing device, wherein the electronic advertising alert causes a message to be displayed on a display of the remote subscriber portable computing device, the message comprising advertising.

2. The method of claim 1, wherein the word graph comprises a tree of words which have predefined relationships.

3. The method of claim 1, wherein the transmission server comprises the microprocessor and a memory that stores the remote subscriber's preferences for songs, destination address, and formatting data associated with the remote subscriber portable computing device.

4. The method of claim 1, further comprising the transmission server receiving from the communications network an identification of a current song being played with the song playing application on the remote subscriber portable computing device.

5. The method of claim 1, wherein the advertising comprises information for at least one of a product and service relevant to the text of a lyric of a current song being played with the song playing application on the remote subscriber portable computing device.

6. The method of claim 1, wherein the message comprises interactive features that request feedback from an operator of the remote subscriber portable computing device.

7. The method of claim 6, wherein the feedback is transmitted from the remote subscriber portable computing device to the transmission server and is stored in memory associated with a remote subscriber's preferences.

8. The method of claim 1, further comprising the microprocessor assigning a score to each matching activator and corresponding child category based on distances between a synset of a work and an activator within a word graph.

9. The method of claim 1, further comprising the microprocessor identifying parent categories relevant to child categories which matched the synsets.

10. The method of claim 9, wherein the microprocessor identifying parent categories relevant to child categories which matched the synsets further comprises the microprocessor assigning a score to parent categories relevant to child categories.

11. A method of distributing advertising content relevant to text of a lyric of a song over a network to a remote subscriber portable computing device, the method, executed by a microprocessor of a transmission server coupled to memory, comprising providing a song playing application to a subscriber for installation on the remote subscriber portable computing device;

receiving advertising data at the transmission server sent from a data source over the Internet, the advertising data including a set of child categories, wherein the child categories comprise categories of advertising; the advertising data further including a word graph; the advertising data also including a set of parent categories relative to the set of child categories, wherein the parent categories comprise categories of advertising;

wherein the microprocessor of the transmission server:

creates a subscriber profile based on information received from the portable computing device;

assigns synsets from the word graph to function as activators for one or more categories of advertising; assigns one or more scores to the set of parent categories based on their relationships to the set of child categories, each score comprising a numerical value that is determined based on at least one of a number of child categories relative to a respective parent category and a depth of child categories relative to a respective parent category; each parent category is assigned a score based on a number and depth of its lowest children; wherein scores for child categories are calculated by starting from the lowest children in a graph and progressing upwards in the graph towards a parent;

compares synsets from the lyric of the song to the word graph by initializing a current hop count for each synset relative to the word graph, the current hop count comprising a numerical value;

identifies child categories relevant to the lyric of the song based on synsets which match one or more activators, by using only hypernym relationships between a synset from a song and an activator;

stores the identified child categories relevant to the lyric of the song in a song categorization database;

filters the identified child categories in the song categorization database and listener categories in a listener database;

selects advertising content based on the filtering step and the subscriber's profile;

generates an electronic advertising alert based on the filtered data and selected advertising content steps;

formats the electronic advertising alert into data blocks according to said formatting data; and transmits the formatted electronic advertising alert over a wireless communication channel to the remote subscriber portable computing device based, wherein the electronic advertising alert causes a message to be displayed on a display of the remote subscriber portable computing device, the message comprising advertising.

12. The method of claim 11, wherein the microprocessor of the transmission server modifies the subscriber profile based on social media content available on the listener.

13. The method of claim 11, wherein the word graph comprises a tree of words which have predefined relationships.

14. The method of claim 11, wherein the transmission server comprises the microprocessor and a memory that stores the remote subscriber's preferences for songs, destination address, and formatting data associated with the remote subscriber portable computing device.

15. The method of claim 11, further comprising the transmission server receiving from the communications network an identification of a current song being played with the song playing application on the remote subscriber portable computing device.

16. The method of claim 11, wherein the advertising comprises information for at least one of a product and service relevant to the text of a lyric of a current song being played with the song playing application on the remote subscriber portable computing device.

17. The method of claim 11, wherein the message comprises interactive features that request feedback from an operator of the remote subscriber portable computing device.

18. The method of claim 17, wherein the feedback is transmitted from the remote subscriber portable computing device to the transmission server and is stored in memory associated with a remote subscriber's preferences.

19. The method of claim 11, further comprising the microprocessor assigning a score to each matching activator and corresponding child category based on distances between a synset of a work and an activator within a word graph.

20. The method of claim 11, further comprising the microprocessor identifying parent categories relevant to child categories which matched the synsets.

* * * * *